(12) United States Patent
Pohl

(10) Patent No.: US 12,395,709 B2
(45) Date of Patent: Aug. 19, 2025

(54) DEVICE AND METHOD FOR SELECTIVE PRESENTATION OF SUBTITLES

(71) Applicant: immerVR GmbH, Hessdorf (DE)

(72) Inventor: Daniel Pohl, Hessdorf (DE)

(73) Assignee: immerVR GmbH, Hessdorf (DE)

( * ) Notice: Subject to any disclaimer, the term of this patent is extended or adjusted under 35 U.S.C. 154(b) by 36 days.

(21) Appl. No.: 18/492,178

(22) Filed: Oct. 23, 2023

(65) Prior Publication Data

US 2024/0137622 A1 Apr. 25, 2024
US 2024/0236439 A9 Jul. 11, 2024

(51) Int. Cl.
| | |
|---|---|
| *H04N 21/488* | (2011.01) |
| *H04N 21/422* | (2011.01) |
| *H04N 21/4223* | (2011.01) |
| *H04N 21/439* | (2011.01) |
| *H04N 21/44* | (2011.01) |
| *H04N 21/442* | (2011.01) |
| *H04N 21/45* | (2011.01) |
| *H04N 21/462* | (2011.01) |
| *H04N 21/81* | (2011.01) |
| *H04N 21/4415* | (2011.01) |

(52) U.S. Cl.
CPC ... *H04N 21/4884* (2013.01); *H04N 21/42203* (2013.01); *H04N 21/4223* (2013.01); *H04N 21/4394* (2013.01); *H04N 21/44008* (2013.01); *H04N 21/44218* (2013.01); *H04N 21/4532* (2013.01); *H04N 21/462* (2013.01); *H04N 21/816* (2013.01); *H04N 21/42201* (2013.01); *H04N 21/4415* (2013.01)

(58) Field of Classification Search
None
See application file for complete search history.

(56) References Cited

U.S. PATENT DOCUMENTS

| | | | |
|---|---|---|---|
| 10,321,174 B1 * | 6/2019 | Wilson | H04N 21/266 |
| 2008/0297657 A1 | 12/2008 | Griffiths et al. | |
| 2009/0133051 A1 * | 5/2009 | Hildreth | H04N 21/42204 725/28 |

(Continued)

OTHER PUBLICATIONS

European Search Report issued in application No. 23202383.8, dated Feb. 27, 2024.

(Continued)

*Primary Examiner* — Alexander Q Huerta
(74) *Attorney, Agent, or Firm* — Barnes & Thornburg LLP

(57) ABSTRACT

A device and a method for selective presentation of subtitles are provided, wherein the device includes one or more processors configured to: receive a video and corresponding subtitle data, the video including audio data, which represent a first language of the video, and other-language content associated with a second language; determine a language skill requirement of the other-language content, the language skill requirement representing a language skill required to translate the other-language content into the first language; determine, whether a language skill of a user satisfies the determined language skill requirement; and in the case that the language skill of the user satisfies the determined language skill requirement, determine to not show the subtitle when presenting the other-language content of the video to the user.

16 Claims, 6 Drawing Sheets

(56) References Cited

U.S. PATENT DOCUMENTS

| | | |
|---|---|---|
| 2015/0243087 A1* | 8/2015 | Saito .................... H04N 5/445 |
| | | 345/633 |
| 2017/0302903 A1 | 10/2017 | Ng et al. |
| 2018/0220195 A1* | 8/2018 | Panchaksharaiah .. G10L 15/005 |
| 2018/0288396 A1* | 10/2018 | Bouazizi .............. H04N 13/167 |
| 2018/0302687 A1* | 10/2018 | Bhattacharjee .... H04N 21/4884 |
| 2018/0367835 A1* | 12/2018 | Hamidi-Rad ........... G06T 11/60 |
| 2019/0073109 A1* | 3/2019 | Zhang .................... G06F 3/013 |
| 2019/0073995 A1* | 3/2019 | Mehra .................... G06F 40/58 |
| 2020/0007946 A1* | 1/2020 | Olkha .................. G06F 40/263 |
| 2020/0099989 A1 | 3/2020 | Niemirska et al. |
| 2020/0359102 A1* | 11/2020 | Sen .................... H04N 21/4856 |
| 2024/0160863 A1* | 5/2024 | Aher ........................ G10L 21/10 |
| 2024/0184817 A1* | 6/2024 | Chandrashekar ........................... H04N 21/23614 |

OTHER PUBLICATIONS

Extended European Search Report issued in application No. 23202383.8, dated May 21, 2024.

* cited by examiner

DEVICE AND METHOD FOR SELECTIVE PRESENTATION OF SUBTITLES

CROSS-REFERENCE TO RELATED APPLICATION(S)

This application claims priority to German Patent Application DE 10 2022 128 012.8 filed on Oct. 24, 2022, the entire contents of which are incorporated herein by reference.

TECHNICAL FIELD

Various embodiments generally relate to a device and a method for selectively presenting subtitles.

BACKGROUND

Various media (such as videos, slideshows, games, apps, etc.) may be provided to a user (or more users) in a primary language (e.g., a language selected by the user), but may also include written text and/or audio in another language. When this other-language content is provided to the user, subtitles, which translate this other-language content into the primary language, may be presented to the user as well. These subtitles may be, for example, narrative subtitles (which may be presented for both, content in the primary language and the other-language content), forced subtitles (which may be presented for the other-language content only), hearing-impaired subtitles, etc. In some media, it may not be possible to deactivate forced subtitles. However, it is found that (e.g., suddenly appearing) subtitles can break an immersion of the medium. According to various aspects, a device and a method are provided which are capable to increase the immersive experience of a user by selectively presenting subtitles depending on a language skill of the user. In particular, a language skill required to translate the other-language content may be determined and the subtitles may only be shown in the case that the language skill of the user does not satisfy this required language skill. Illustratively, subtitles may be shown only in the case that the user can not translate the other-language content by himself/herself. Thus, in the case that the user can translate the other-language content, no break of the immersion happens such that the immersive experience of the user is increased. This applies to (e.g., classical) two-dimensional media and also to immersive media for computer-simulated reality (such as augmented reality and virtual reality). The above-described subtitle-induced break of immersion may be even greater in the case of immersive media.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1A:
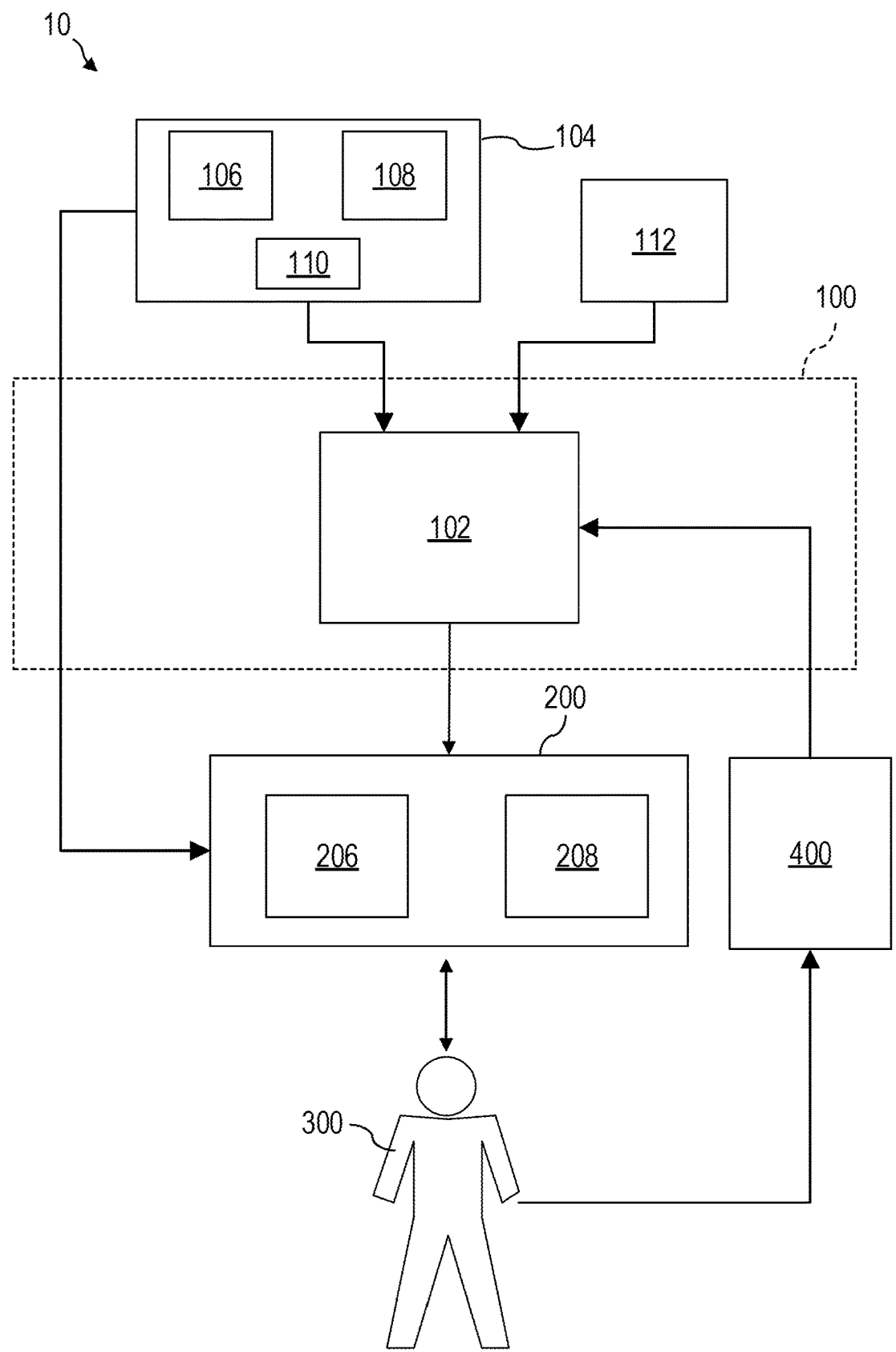
FIG. 1A and FIG. 1B each show a system for presenting (e.g., immersive) media to one or more users according to various aspects.

The following detailed description refers to the accompanying drawings that show, by way of illustration, specific details, and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments. Various embodiments are described in connection with methods and various embodiments are described in connection with devices. However, it may be understood that embodiments described in connection with methods may similarly apply to the devices, and vice versa.

The term "circuit" may be understood as any kind of a logic implementing entity, which may be hardware, software, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be software being implemented or executed by a processor, e.g. any kind of computer program, e.g. a computer program using a virtual machine code such as e.g. Java. The term "processor" may be understood as any kind of entity capable to process data and/or signals. For example, the data or signals may be handled according to at least one (i.e., one or more than one) specific function performed by the processor. A processor may include or may be an analog circuit, a digital circuit, a mixed signal circuit, a logic circuit, a microprocessor, a central processing unit (CPU), a graphics processing unit (GPU), a digital signal processor (DSP), a programmable gate array (FPGA), an integrated circuit, or any combination thereof. Any other method of implementing the respective functions, described in more detail below, may also be understood to include a processor or logic circuit. It is understood that one or more of the method steps described in detail herein may be carried out (e.g., implemented) by a processor, through one or more specific functions performed by the processor. The processor may therefore be arranged to carry out any of the information processing methods or components thereof described herein.

Computer-simulated reality provides a highly immersive experience to users. Showing subtitles to translate other-language content may break this immersive experience. Various aspects relate to a device and a method which determine whether the user can translate the other-language content by himself/herself and the subtitles may be shown only in the case that the user cannot translate the other-language content by himself/herself (hence, the subtitles may not be necessary if the user can translate the other-language content). Thereby, the device and the method are capable to user-specifically improve the (e.g., computer-simulated) immersive experience.

Figure 1B:
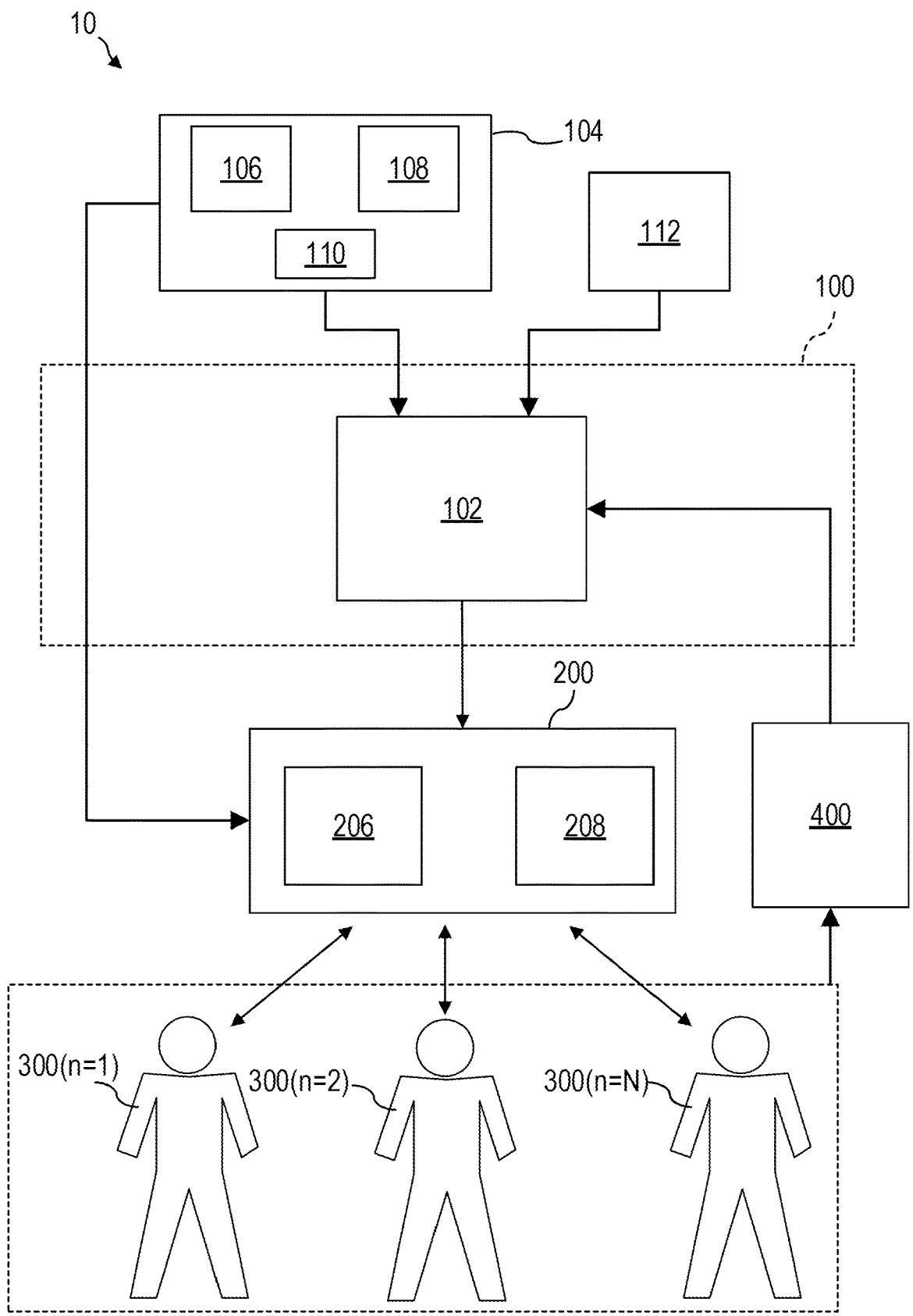

FIG. 1A and FIG. 1B each show a system 10 (e.g., an immersive technology system) according to various aspects. The system 10 may include a device 100. The device 100 may include one or more processors 102. The system 10 may include one or more output devices 200. The one or more output devices 200 may be configured to present media to one or more users.

In some aspects, the one or more output devices 200 may be configured to present media to a single user 300 (see, for example, FIG. 1A). Hence, only one user can experience (e.g., see and/or hear) the media at a same time. In this case, the one or more output devices 200 may be or may be part of a head-mounted display, an augmented reality device (e.g., augmented reality glasses, a head-mounted display with video-see-through, etc.), etc.

In other aspects, the one or more output devices 200 may be capable to present media also to two or more users 300($n$=1 to N, with N≥2) (see, for example, FIG. 1B). Hence, two or more users could experience (e.g., see and/or hear) the media at a same time. It is understood that, in this case, the one or more output devices 200 may also be capable to present the media to a single user. The one or more output devices 200 (capable to present the media also to two or more users) may be or may be part of a smartphone, a tablet, a laptop, etc.

The one or more processors 102 may be configured to control the one or more output devices 200. For example, the one or more processors 102 may control how the media are presented by the one or more output devices 200. According to various aspects, the one or more processors 102 may be configured to user-specifically control the presentation of the media via the one or more output devices 200. For example, in the case that the one or more output devices 200 are configured to present the media only to the single user 300, the one or more processors 102 may be configured to control the presentation of the media via the one or more output devices 102 depending on the single user. For example, in the case that the one or more output devices 200 are configured to present the media to two or more users 300($n$=1 to N), the one or more processors 102 may be configured to control the presentation of the media via the one or more output devices 102 depending on each user of the two or more users. Illustratively, the one or more processors 102 may control how the media are presented by the one or more output devices 200 depending on who is using the system 10.

According to various aspects, the one or more processors 102 may be configured to determine the (single) user 300 from a plurality of (e.g., known) users. For example, the user 300 may be logged in at the system 10 with his/her user profile (e.g., a user profile associated with an operating system (e.g., in the case of a smartphone, a laptop, a tablet, etc.) and/or a user profile associated with a program (e.g., an app) used to present the media to the user 300 (e.g., a user profile of a streaming program for presenting a video to the user 300). The system 10 may be or may include a user device (such as a smartphone, a tablet, a laptop, a head-mounted display, augmented reality glasses, etc.) which may be connected to another device via a wireless network connection (e.g., a Bluetooth connection, a wireless local area network (WLAN), etc.) and the one or more processors 102 may be configured to determine the user 300 from the plurality of users using information regarding this wireless network connection (such as a media-access-control (MAC) address of the user device).

According to various aspects, the system 10 may include one or more detection devices 400. The one or more detection devices 400 may be configured to detect the user 300 or users 300($n$=1 to N) using the system 10. According to some aspects, the one or more detection devices 400 may be configured to determine the user 300 or users 300($n$=1 to N) using the system 10 from the plurality of users and provide information on who is using the system 10 to the one or more processors 102. According to other aspects, the one or more detection devices 400 may be configured to provide information regarding the detected user 300 or users 300 ($n$=1 to N) to the one or more processors 102 and the one or more processors 102 may be configured to determine the user 300 or users 300($n$=1 to N) using the system 10 from the plurality of users. Illustratively, the one or more detection devices 400 and/or the one or more processors 102 may be configured to determine who is using the system 10. For example, the one or more detection devices 400 may include at least one biometric sensor (e.g., a fingerprint sensor (e.g., of a smartphone), a camera sensor for facial authentication (e.g., of a smartphone, a head-mounted display, etc.), an iris sensor, a voice recognition sensor, etc.) configured to detect biometric data of the user 300 and the one or more processors 102 may be configured to determine the user 300 from the plurality of users using these detected biometric data. As an example, a biometric sensor of the at least one biometric sensor may be an eye-tracking camera configured to capture an image of a first eye (e.g., the right eye) and/or a second eye (e.g., the left eye) of the user 300 and the one or more processors 102 may be configured to determine the user 300 from the plurality of users using an eye shape of the first eye and/or second eye, iris properties of the first eye and/or second eye, and/or patterns of eye movement of the first eye and/or second eye, etc. As an example, a biometric sensor of the at least one biometric sensor may be a microphone and the one or more processors 102 may be configured to determine the user 300 from the plurality of users using voice recognition in the case that the user 300 speaks into the microphone.

The one or more detection devices 400 may include a camera (e.g., a webcam of a smartphone, a webcam of a tablet, a webcam of a laptop, a webcam of a television, TV, a face camera of a head-mounted display, etc.) configured to capture an image (showing at least a part) of the user 300 and the one or more processors 102 may be configured to determine the user 300 from the plurality of users using the detected image. As an example, the camera may be configured to detect a face image showing at least a part of a face of the user 300 (e.g., the whole face of the user 300 or only a lower portion of the face including a mouth of the user 300 or only a portion of the face including at least one eye of the user 300) and the one or more processors 102 may be configured to determine the user 300 from the plurality of users using the detected face image. As described herein, the one or more output devices 200 may be capable to present the media to two or more users. In this case, the system 10 may include a camera configured to capture viewer image showing one or more users viewing the one or more output devices 200 (e.g., a display device 206 of the one or more output devices 200) and the one or more processors 102 may be configured to determine each user 300($n$) of the one or more users viewing the one or more output devices 200 (e.g., from the plurality of users) using the viewing image. For example, the viewing image may show two or more users and the one or more processors 102 may be configured to determine each user of the two or more users from the plurality of users. The one or more detection devices 400 may include a brain-computer-interface configured to detect brain data which represent a brain pattern of the user 300 and the one or more processors 102 may be configured to determine the user 300 from the plurality of users using the detected brain data. For example, the system 10 may be or may include a head-mounted display and the head-mounted display may include the brain-computer-interface.

According to various aspects, the one or more processors 102 may be configured to determine the user 300 from the plurality of users using one or more of the above-described information.

A medium which shall be presented (e.g., to the user 300) via the one or more output devices 200 may be associated with a first language. This first language may be a primary language. For example, at least 90% (e.g., at least 95%, e.g., at least 98%) of the (e.g., written and/or audio) content of the medium may be in the first language. However, the medium may also include content in a second language different from the first language. Content in a language different from the first (e.g., primary) language may be referred to as other-language content. In the following, various aspects are described for the other-language content in the second language. It is understood that the medium may also include other-language content in a third language different from the first language and the second language, other-language content in a fourth language different from the first language, the second language, and the third language, and so on. The principles for the other-language content in the second language, as described herein, apply similarly to other-language content in a language different from the second language. The medium may include subtitle data representing a subtitle (or subtitles) which are a translation of the other-language content into the first language.

According to various aspects, the one or more processors 102 may be configured to control the one or more output devices 200 to selectively show the subtitle depending on a language skill of the user 300 or a respective language skill of each user of the two or more users 300($n$=1 to N). In the following, a video is described as an example of the medium to illustrate the principles of selectively showing subtitles. The video may be, for example, a (e.g., classical) two-dimensional video, a three-dimensional video, or an immersive video. It is understood that the video is only an example for the medium and that the medium may be any other kind of medium including other-language content, such as a game (e.g., a computer game, a console game, an app game, etc.), a slideshow (e.g., of two-dimensional and/or immersive images), a computer program, an app (e.g., for a smartphone and/or tablet), a museum tour, live captioning, etc. Thus, the principles of selectively showing subtitles can be employed for each medium which can present (e.g., visually and/or audibly) subtitles for other-language content).

In the following, the principles of selectively showing subtitles are described for the single user 300. It is understood that this applies analogously to the case in which two or more users are using the system 10 (in some aspects referred to as multi-user environment). In particular, in the case that two or more users are using the system 10, the one or more processors 102 may be configured to determine for each user of the two or more users, whether a language skill of a respective user for the second language satisfies the determined language skill requirement and to determine, in the case that it is determined that the respective language skill of each user of the two or more users satisfies the determined language skill requirement, to not show the subtitle when presenting the other-language content of the video. Illustratively, in a multi-user environment, there may be a fall back to the lowest common language skill of the users. As an example, a camera on a TV may detect three users and all of them already have a language skill profile; even if two users are native German speakers, but the third user has only a medium language skill for German, the one or more processors 102 may determine whether to show the subtitle based on the medium language skill for German. It is understood that this scenario refers to use-cases in which two or more users use the same one or more output devices 200 for viewing the medium. For example, in a metaverse scenario in which the three users meet only virtually to watch the same media from within their head-mounted display (e.g., virtual reality headset), the one or more processors 102 may be configured to individually determine for each user whether to show the subtitle via the respective head-mounted display or not.

The one or more processors 102 may be configured to receive a (e.g., immersive) video 104 (as example for a medium). The video 104 may include a plurality of images 106. The one or more output devices 200 may be configured to present the video 104 to the user 300. Presenting the video 104 to the user 300 may include to provide the plurality of images 106 of the video 104 one after another with a predefined frame rate (e.g., 30 frames per second, 60 frames per second, 120 frames per second, etc.). The video 104 may include audio data 108 corresponding to the plurality of images 106. The audio data 108 may represent the first (e.g., primary) language of the video 104. The video 104 may also include other-language content 110 associated with (e.g., in) the second language (different from the first language). The one or more processors 102 may be configured to receive subtitle data 112. The subtitle data 112 may represent one or more subtitles which include a translation of the other-language content into the first language. Hence, the video 104 may include visual content (e.g., the plurality of images 106) and audio content (e.g., the audio data 108). A primary language of the audio content may be the first language. The visual content and/or the audio content may include the other-language content 110 in the second (e.g., secondary) language. In an example, one or more images of the plurality of images 106 of the video 104 may include written text in the second language and this written text may be the other-language content. In another example, a portion of the audio data 108 may represent spoken text in the second language and this spoken text may be the other-language content. The one or more subtitles represented by the subtitle data 112 may include a translation of the written text and/or the spoken text into the first language. In the following, the one or more subtitles are described as a (single) subtitle for illustration. It is understood that the subtitle data 112 may represent more than one subtitle. A "subtitle", as described herein, may refer to one or more words which are shown substantially at the same time. A subtitle may include a single word or more than one word (e.g., a sentence).

According to various aspects, the video may be an immersive video. In this case, the one or more output devices 200 may be configured to provide computer-simulated reality in accordance with the immersive video to the user 300. An immersive video, as described herein, may be any kind of video (e.g., including immersive images) that allows to display, via a dedicated device, computer-simulated reality content in accordance with the video. Hence, an immersive video may show content which allows to provide computer-simulated reality. Computer-simulated reality (CR) may be related to any kind of immersive environment. The immersive environment may take place in the physical world with, optionally, information (e.g., objects) added virtually (e.g., the computer-simulated reality may be an augmented reality (AR)). The immersive environment may take place in a virtual world (e.g., the computer-simulated reality may be a virtual reality (VR)). It is understood that the virtual world may show a simulation of real-world content. The immersive environment may take place in both, the physical world and the virtual world (e.g., the computer-simulated reality may be a mixed reality (MR)). The immersive environment may be a combination of AR, VR, and MR (e.g., the computer-simulated reality may be an extended reality (XR)). Thus, the immersive video may be associated with AR, VR, MR, and/or XR.

The one or more output devices 200 may include a display (output) device 206. The display device 206 may be configured to display the plurality of images 106 of the video 104 and to display the subtitle in accordance with the subtitle data 112. For example, the video 104 may be an immersive video and the display device 206 may be configured to provide computer-simulated reality in accordance with the immersive video. The display device 206 may be a head-mounted display, a display of augmented reality glasses, a display of a laptop, a display of a smartphone, a display of a tablet, a display of a TV, etc.

The one or more output devices 200 may include an audio (output) device 208. The audio device 208 may be configured to output audio in accordance with the audio data 108. For example, the audio device 208 may be or may include one or more speakers and/or headphones.

The one or more output devices 200 may include one or more other output devices. As an example (e.g., in the case of computer-simulated reality), the one or more output devices 200 may include a haptic (output) device, such as a hand controller, a vibrator (e.g., included in a head-mounted display), a haptics vest, a full body haptics suit, a mouth haptics device (e.g., for lips and/or teeth), etc.

According to various aspects, the one or more processors 102 may be configured to determine, whether to present the subtitle in accordance with the subtitle data 112 to the user 300 (or not). A respective processing scheme for determining whether to present subtitles is shown in each of FIG. 2A to FIG. 2C.

Figure 2A:
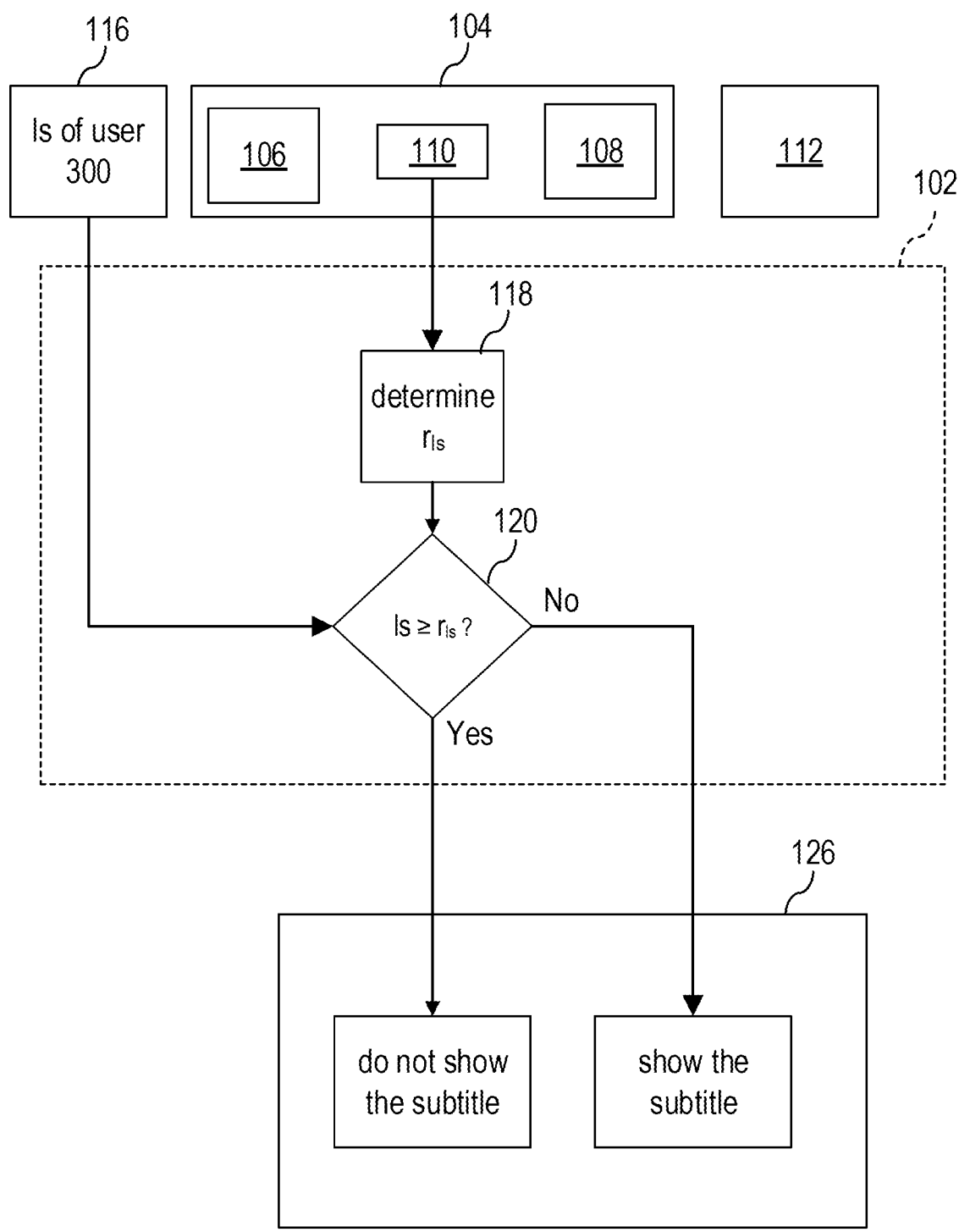
FIG. 2A to FIG. 2C each show a respective processing scheme for determining whether to present subtitles or not.
Figure 2B:
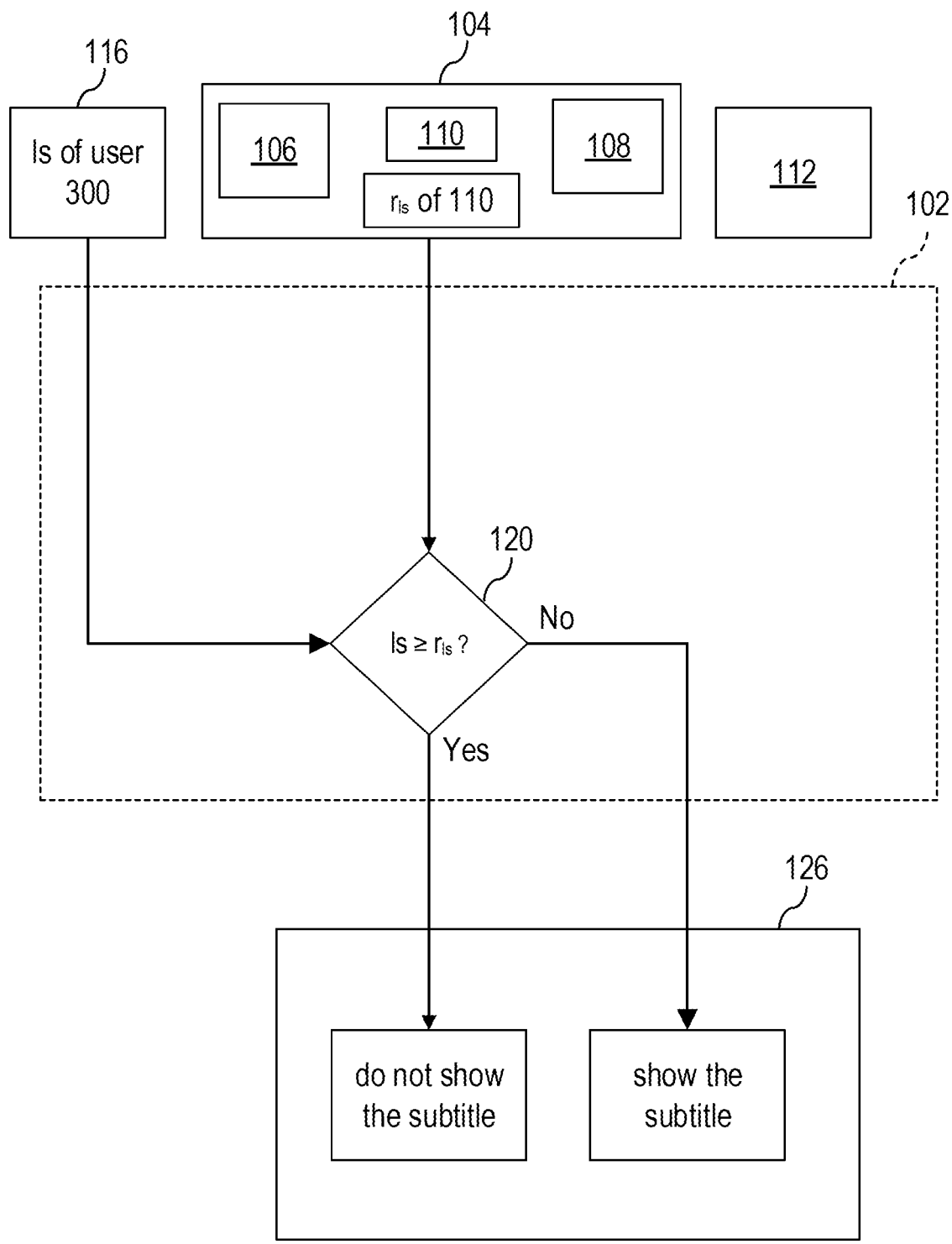

The one or more processors 102 may be configured to receive user profile data 116 of the user 300 (or respective user profile data of each user of the two or more users 300($n$=1 to N)) (see, for example, FIG. 2A). The user profile data 116 of the user 300 may define the language skill, ls, of the user 300 for the second language. The user profile data 116 of the user 300 may also define a language skill of the user 300 for a third language different from the first language and the second language, for a fourth language different from the first language, the second language, and the third language and so on. Thus, the user profile data 116 may represent a user profile of the user 300 including a respective language skill for each language of a plurality of languages. In the following, the user profile data 116 are described as including the language skill of the user 300 for the second language for illustration.

A "language", as described herein, may be any language regardless of whether the language is spoken or not. Thus, besides all spoken languages, a language may also be Latin and/or sign language. It is understood that sign language varies not only between countries but also between regions within countries such that a language may also be a sign language of a specific region.

A "language skill", as described herein, may be associated with any kind of suitable ranking. For example, a language skill may be ranked with natural numbers from a first number to a second number higher than the first number (e.g., from 0 to 3, from 0 to 5, from 1 to 10, etc.), or may be ranked in decimals from a first number to a second number higher than the first number (e.g., from 0 to 1 in steps of 0.1), or may be ranked into classes, such as no language skill, low language skill, medium language skill, high language skill, and native language skill. It is understood that these are only examples and that the language skill may be associated with any kind of suitable ranking. A language skill requirement, as described herein, may be associated with the same ranking as used for the language skill of the user 300. A language skill, as described herein, may also be denoted as language skill level.

According to some aspects, the user 300 may provide the language skill for the second language. For example, the system 10 may include at least one input device for inputting data (e.g., a keyboard, a touchscreen, a microphone, etc.) and the user 300 may provide his/her language skill, ls, for the second language via the at least one input device. This may be a manually configured language skill profile associated with the user profile data 116. Hence, the user 300 may input his/her language skill based on his/her own subjective evaluation. As an illustrative example, a user may add German as his/her native language, as the user was three years living in the US, he/she sets English (US) skills to very good, and since the user had French lessons during school he/she considers himself/herself to be medium-skilled.

According to some aspects, the one or more processors 102 may be configured to determine the language skill, ls, of the user 300 for the second language. For example, the one or more processors 102 may be configured to control the one or more output devices 200 (e.g., via the display device 206 and/or the audio device 208) to provide instructions (e.g., visually and/or audibly) to the user 300 which instruct the user 300 to speak in the second language. As an example, the instructions may instruct the user 300 to read aloud a text given in the second language. In this case, the one or more processors 102 may be configured to determine the language skill, ls, of the user 300 using his/her reading speed and/or pronunciation (e.g., by employing a machine learning model configured to output a language skill responsive to inputting spoken text. This model may be trained using training data from many users with different skills).

As another example, the instructions may instruct the user 300 to have a conversation (e.g., a voice dialog) in the second language (e.g., with a bot). The system 10 may include a microphone (e.g., as input device) configured to acquire voice information by capturing audio of the speaking user 300. The one or more processors 102 may be configured to determine the language skill, ls, of the user 300 for the second language using the acquired voice information. For example, the one or more processors 102 may be configured to implement a machine-learning model configured to output a language skill based on the voice data captured during the conversation.

A machine-learning model may be, for example, a reinforcement learning model (e.g., employing Q-learning, temporal difference (TD), deep adversarial networks, etc.), a classification model (e.g., a linear classifier (e.g., logistic regression or naive Bayes classifier), a support vector machine, a decision tree, a boosted tree, a random forest, a neural network, or a nearest neighbor model). A neural network may be any kind of neural network, such as a convolutional neural network, an autoencoder network, a variational autoencoder network, a sparse autoencoder network, a recurrent neural network, a deconvolutional network, a generative adversarial network, a forward-thinking neural network, a sum-product neural network, among others.

Figure 2C:
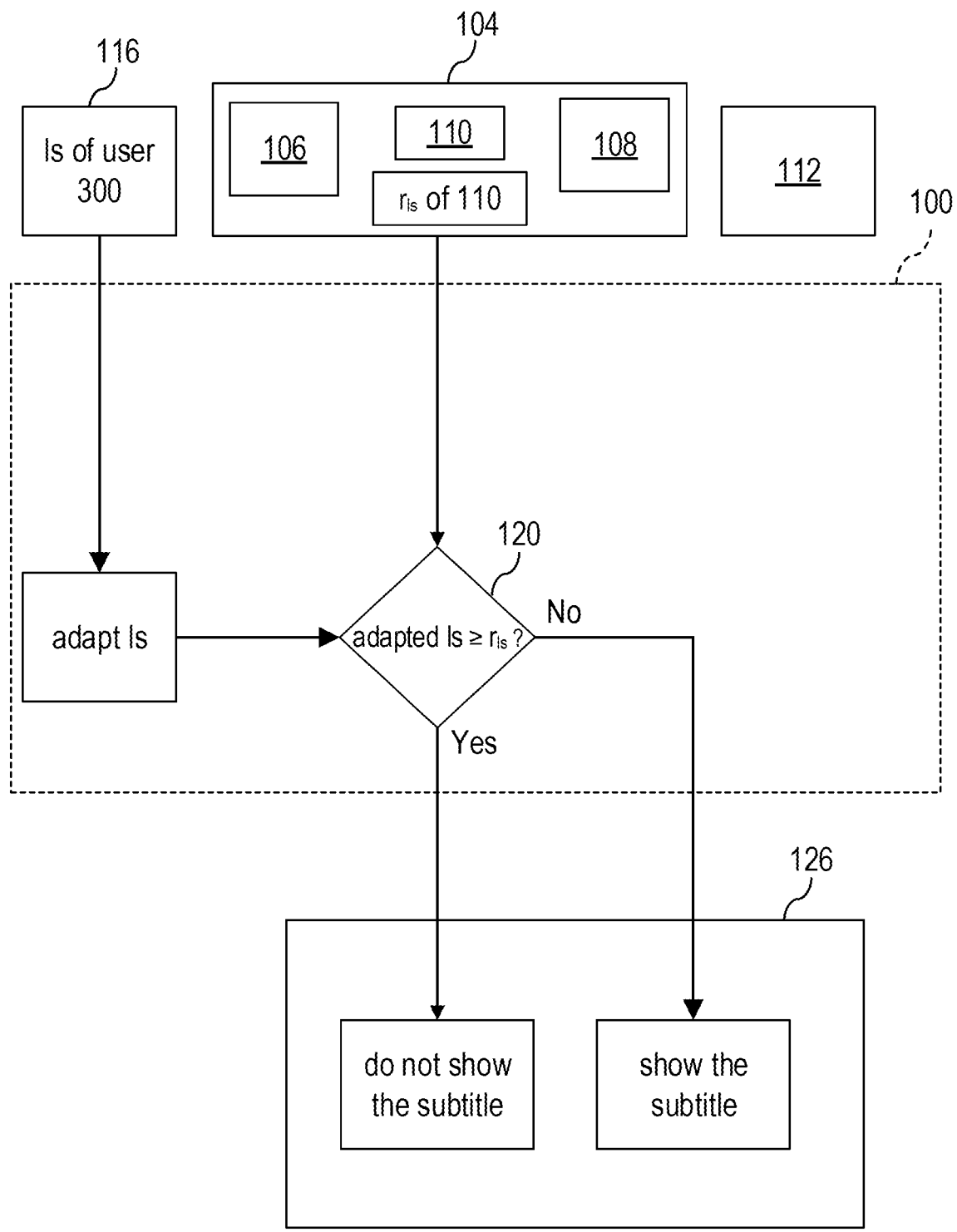

According to various aspects, the user 300 may provide his/her language skill, ls, for the second language and the one or more processors 102 may be configured to adapt the provided language skill, ls, of the user 300 for the second language (see, for example, FIG. 2C). For example, the one or more processors 102 may instruct the user 300 to speak in the second language and may adapt the language skill, ls, provided by the user 300 based on the acquired voice information.

The one or more processors 102 may be configured to adapt the provided language skill, ls, of the user 300 for the second language based on language skills of similar languages. A language may be similar to another language in the case that there are many common words in both languages. As an example, there are many common words between German and Austrian such that a German native speaker may have a high language skill for Austrian. As another example, there are some common words between German and Dutch such that a German native speaker may have at least a low language skill for Dutch. According to various aspects, the user profile data 116 may further define a language skill of the user 300 for a third language different from but similar to the second language and the one or more processors 102 may be configured to adapt the language skill, ls, of the user 300 for the second language based on the language skill of the user 300 for the third language. According to some aspects, the one or more processors 102 may be configured to determine the language skill for the second language based on the language skill for the other language which is similar to the second language. For example, the user profile data 116 may not include a language skill for the second language but a language skill for the similar other language, and the one or more processors 102 may be configured to determine the language skill, ls, of the user 300 for the second language using the language skill for the similar other language.

The one or more processors 102 may be configured to adapt the provided language skill, ls, of the user 300 for the second language based on a travel history of the user 300. The one or more processors 102 may be configured to determine the travel history of the user 300. For example, data stored in a memory on a user device (e.g., a smartphone, a tablet, a laptop, etc.) and/or in a cloud associated with the user device may include location information. As an example, photos may include global positioning system, GPS, data. The one or more processors 102 may be configured to determine, whether the location information include a location within a country in which the second language is an official language. The one or more processors 102 may be configured to, in the case that it is determined that the location information include a location within a country in which the second language is an official language, adapt (e.g., increase) the language skill, ls, of the user 300 for the second language. As an example, if the user 300 has been to Spain ten times within the last three years, it is only natural that he has picked up at least some basic language skill, therefore, (e.g., even if not manually specified), the one or more processors 102 may determine that the user 300 has at least a low language skill for Spanish.

The one or more processors 102 may be configured to adapt the provided language skill, ls, of the user 300 for the second language based on a web browsing history of a user device (e.g., a smartphone, a tablet, a laptop, a head-mounted display, etc.) associated with the user 300. For example, the one or more processors 102 are configured to determine, whether one or more webpages of the web browsing history are in the second language and, in the case that it is determined that one or more webpages of the web browsing history are in the second language, adapt (e.g., increase) the language skill, ls, of the user 300 for the second language. As an example, if the user 300 frequently visits French websites (and is not using an automatic translation tool), the one or more processors 102 may determine that the user 300 has at least some basic language skill for French.

According to various aspects, a language skill requirement, $r_{ls}$, of the other-language content 110 may be compared to the language skill, ls, of the user 300 for the second language. The language skill requirement, $r_{ls}$, of the other-language content 110 may represent a language skill required to translate the other-language content 110 into the first language. Illustratively, the language skill requirement, $r_{ls}$, for the second language may define an expectation on a language skill the user 300 has to have for the second language in order to (correctly) translate the other-language content into the first language. Hence, the language skill requirement, $r_{ls}$, may be an estimation on how hard to understand the other-language content 110 in the second language is.

According to some aspects (see, for example, FIG. 2A), the one or more processors 102 may be configured to determine (in 118) the language skill requirement, $r_{ls}$, of the other-language content 110. According to some aspects (see, for example, FIG. 2B and FIG. 2C), the one or more processors 102 may be configured to receive the language skill requirement, $r_{ls}$, of the other-language content 110 (e.g., as part of the video 104). In this case, one or more other processors may be configured to determine the language skill requirement, $r_{ls}$, of the other-language content 110. As an exemplar, the determination may be carried out on a cloud server. Thus, the language skill requirement, $r_{ls}$, of the other-language content 110 may be determined prior to providing the video 104 to the device 100. The language skill requirement, $r_{ls}$, of the other-language content 110 may be user-independent. Therefore, the language skill requirement, $r_{ls}$, of the other-language content 110 can be determined once for the other-language content 110 and then provided to all devices requesting the video 104. This reduces the processing costs significantly. In the following, various aspects of the determination of the language skill requirement, $r_{ls}$, of the other-language content 110 are described as being carried out by the one or more processors 102. It is understood that this applies analogously to the case in which the language skill requirement, $r_{ls}$, of the other-language content 110 is determined by one or more other processors (e.g., on a cloud server).

The one or more processors 102 may be configured to determine the language skill requirement, $r_{ls}$, of the other-language content 110 by evaluating the other-language content 110 word-by-word. The other-language content 110 may include one or more words in the second language. The one or more processors 102 may be configured to determine a respective word translation level for each word of the one or more words of the other-language content 110. This respective word translation level may represent a language skill required to translate the word into the first language. The one or more processors 102 may be configured to determine the language skill requirement, $r_{ls}$, of the other-language content 110 using the determined word translation levels. According to various aspects, the system 10 may include a memory device. The memory device may be configured to store data (e.g., a database) including a respective word translation level of a plurality of words (e.g., substantially each word) in the second language for each language (e.g., for the first language). Thus, the word translation level associated with a word in the second language may depend on the first language. The word translation level associated with a specific word in the second language may indicate how hard to translate the specific word is. As an example, the first language may be German and the second language may be English; words like "they" and/or "police" may be considered as easily understandable whereas words like "embezzlement" and/or "abject" may be considered as hard to understand. In some aspects, the language skill requirement, $r_{ls}$, of the other-language content 110 may be given by a sum of the word translation levels. In other aspects, the language skill requirement, $r_{ls}$, of the other-language content 110 may be given by an average (e.g., arithmetic average or median average) of the word translation levels. In even further aspects, the language skill requirement, $r_{ls}$, of the other-language content 110 may be a ranking into language skill classes, such as no language skill, low language skill, medium language skill, high language skill, and native language skill. In this case, the other-language content 110 may be ranked into a language skill class depending on the sum of the word translation levels or the average of the word translation levels (e.g., using one or more threshold values associated with the sum or the average). As an illustrative example, a word translation level may be given by a number between 1 and 10 (with 1 being easy to understand and 10 being hard to understand): in the case that the other-language content 110 states "They called the police", an exemplary sum of the respective word translation levels may be 1+2+ 1+2 (being on average 1.5; an average threshold value between a low language skill and a medium language skill may be an average of 2 such that the average 1.5 may result in a low language skill represented by the language skill requirement). As another illustrative example, the other-language content 110 may state "This exceeding trifling witling", an exemplary sum of the respective word translation levels may be 1+3+10+10 (being on average 6; an average threshold value between a medium language skill and a high language skill may be an average of 5 such that the average 6 may result in a high language skill represented by the language skill requirement).

The one or more processors 102 may be configured to adapt the respective word-translation level of at least one word (e.g., each word) of the one or more words of the other-language content 110 considering a similarity between the at least one word in the second language and its translation into the first language. The one or more processors 102 may be configured determine the language skill requirement of the other-language content 110 using the adapted word translation level. The one or more processors 102 may be configured to determine the translation of the at least one word of the one or more words into the first language using the subtitle data (since the subtitle of the subtitle data already includes the translation). The one or more processors 102 may be configured to determine a similarity value representing a similarity between the at least one word and its translation. The one or more processors 102 may be configured to determine, whether the similarity value is equal to or greater than a predefined similarity threshold value. The one or more processors 102 may be configured to, in the case that it is determined that the similarity value is equal to or greater than the predefined similarity threshold value, adapt the word translation level determined for the at least one word to reduce the language skill required to translate the at least one word into the first language. As an illustrative example, the first language may be German and the second language may be English and the other-language content 110 may include the word "police"; the one or more processors 102 may be configured to determine a high similarity between the English word "police" and the German word "Polizei" and therefore reduce the word translation level (i.e., the language skill required to translate the word "police" into German). According to various aspects, the one or more processors 102 may be configured to determine the similarity value in consideration of one or more synonyms of the translation of at least one word. As an illustrative example, the first language may be German and the second language may be English and the other-language content 110 may include the word "doctors" and the subtitle may include "Ärzte" as German translation; the one or more processors 102 may be configured to determine the German word "Doktoren" as synonym for "Ärzte" and may then determine a high similarity between the English word "doctors" and the German word "Doktoren" and therefore reduce the word translation level (i.e., the language skill required to translate the word "doctors" into German).

The one or more processors 102 may be configured to adapt the language skill requirement, $r_{ls}$, of the other-language content 110 using a sentence-by-sentence evaluation. In this case, the other-language content 110 may include at least one sentence (e.g., including the one or more words). For example, the one or more processors 102 may be configured to evaluate the other-language content 110 word-by-word and may adapt the determine average value based on the sentence-by-sentence evaluation. The one or more processors 102 may be configured to determine a tense of the at least one sentence. The one or more processors 102 may be configured to determine a sentence translation level of the at least one sentence using the word translation levels of each word of the at least one sentence and the determined tense of the at least one sentence. The sentence translation level may represent a language skill required to translate the at least one sentence into the first language. As an illustratively example, the first language may be German and the second language may be English and the tense of the at least one sentence may include hard grammar (e.g., future perfect in German grammar and indirect speech); the one or more processors 102 may be configured to adapt the average value determined for the words of the sentence to increase the language skill required to translate the at least one sentence into the first language due to the hard grammar.

The one or more processors 102 may be configured to adapt the language skill requirement, $r_{ls}$, of the other-language content 110 using a context evaluation. The other-language content 110 may be associated with a scene of the video 104 (e.g., represented by one or more images of the plurality of images 106 and/or audio information associated with the audio data 108). The one or more processors 102 may be configured to determine a context of the scene. The one or more processors 102 may be configured to determine a subtitle relevance using the other-language content and the context of the scene. The subtitle relevance may indicate whether the context of the scene reduces the language skill required to translate the other-language content 110 into the first language. The one or more processors 102 may be configured to, in the case that the subtitle relevance indicates that the context of the scene reduces the language skill required to translate the other-language content 110 into the first language, adapt the language skill requirement, $r_{ls}$, of the other-language content 110 to reduce the language skill required to translate the other-language content 110 into the first language. According to some aspects, the plurality of images 106 and/or the audio data 108 of the video 104 may be labelled (e.g., humanly labelled) with a context of a respective scene. According to other aspects, the one or more processors 102 may be configured to implement a machine-learning model configured to output the context of the respective scene responsive to inputting an image of the plurality of images 106 and/or the audio data 108 of the video 104 into the machine-learning model. For example, the machine-learning model may be a segmentation model configured to classify objects within each image of the plurality of images 106 and the one or more processors 102 may be configured to determine the context of a scene using the classified objects of an associated image. Similarly, a machine-learning model may be configured to classify audio objects within the audio data 108. As an illustrative example, a current scene may be associated with about 500 images of the plurality of images 106 and the machine-learning model may classify objects shown in these about 500 images as several cars, flashing blue lights of some cars, and another machine learning model may classify audio objects as alarm sirens; the one or more processors 102 may then determine the context of a scene as a car chase. In the case that within this context (in the case that the second language is Danish and the first language English") the letters "POLITI" are shown on the door of a police vehicle, the one or processors 102 may determine that the context of the scene (being a car chase including police cars) reduces the language skill required to translate the word "politi" into the English word "police". As another illustrative example, a current scene may show a smartphone which displays an image of an envelope next to written text stating "7 new messages" as other-language content 110; the one or more processors 102 may determine, based on the context of the scene and considering the image of the envelope, that the other-language content 110 is clear from context, thereby reducing the required language skill. The one or more processors 102 may be configured to determine from the context of the scene, whether a translation of the other-language content 110 is helpful at all. For example, a building, which is not relevant to the context of the scene (e.g., merely in the background) may show a signs stating "Storage"; the one or more processors 102 may determine that this translation is not necessary at all and may, therefore, change the required language skill to "no language skill" (resulting in that the subtitle is not shown).

The one or more processors 102 may be configured to adapt the language skill requirement, $r_{ls}$, of the other-language content 110 considering the characters of the first language and the second language. For example, in the case that the second language used different characters than the first language, the one or more processors 102 may be configured to increase the required language skill. As an illustrative example, the first language may use Arabic characters whereas the second language may use Chinese (or Japanese or Russian) characters; the one or more processors 102 may determine that these characters are quite different and therefore increase the language skill requirement, $r_{ls}$, of the other-language content 110.

The one or more processors 102 may be configured to adapt the language skill requirement, $r_{ls}$, of the other-language content 110 by evaluating a readability and/or an audibility of the other-language content 110. For example, one or more images of the plurality of images 106 of the video 104 may include written text as the other-language content 110 and the subtitle may include a translation of the written text into the first language. In this case, the one or more processors 102 may be configured to adapt the language skill requirement, $r_{ls}$, of the other-language content 110 by evaluating the readability of the written text. For example, a portion of the audio data 108 may represent spoken text as the other-language content 110 and the subtitle may include a translation of the spoken text into the first language. In this case, the one or more processors 102 may be configured to adapt the language skill requirement, $r_{ls}$, of the other-language content 110 by evaluating the audibility of the spoken text.

The one or more processors 102 may be configured to evaluate the readability of the written text by determining a readability value which represents a readability of the written text. The one or more processors 102 may be configured to determine, whether the readability value is equal to or less than a predefined readability threshold value and, in the case that it is determined that the readability value is equal to or less than the predefined readability threshold value, to adapt the language skill requirement of the other-language content 110 to increase the language skill required to translate the other-language content into the first language. Illustratively, the required language skill may be increased in the case that the written text is hard to read. The one or more processors 102 may be configured to determine the readability value using a font size of the written text and to increase the readability value with increasing font size (hence, the larger the text the easier to read). The one or more processors 102 may be configured to determine a size of the display device 206 and to determine the readability value using the font size of the written text and the determined size of the display device 206 (hence, the more space the written text occupies on the display device 206, the easier to read the written text). Hence, a written text (with a predefined font size) may be easier to read on a TV than on a smartphone. The one or more processors 102 may be configured to consider whether the user 300 is visually impaired. For example, the one or more detection devices 400 may include the camera to capture an image of the user 300 and the one or more processors 102 may be configured to determine, using the image, whether the user 300 is visually impaired (e.g., by determining, whether the user 300 wears glasses). According to some aspects, user profile data may include information indicating whether the user 300 is visually impaired or not. The one or more processors 102 may be configured to determine the readability value using a font style of the written text. For example, in the case that the font style is italics, the one or more processors 102 may decrease the readability value. The one or more processors 102 may be configured to determine, whether the written text is hand-written, and to decrease the readability value in the case that it is determined that the written text is handwritten. The one or more processors 102 may be configured to determine the readability value using optical character detection, OCR. For example, the one or more processors 102 may be configured to apply OCR on the written text to determine an optical character detected text and an optical character detection value (e.g., a confidence value in the case of an OCR machine learning model) representing a difficulty of detecting the optical character detected text. The one or more processors 102 may be configured to determine the readability value such that the readability value decreases with increasing difficulty of detecting the optical character detected text. The one or more processors 102 may be configured to consider a time period for which the written text will be displayed when presenting the other-language content 110 to the user 300. For example, the one or more processors 102 may be configured to a display time period (representing the time period for which the written text will be displayed when presenting the other-language content 110 to the user 300) using an image number of the images showing the written text and a frame rate (e.g., in frames per second) of the video 104. The one or more processors 102 may be configured to determine a read time period required to read the written text and to determine the readability value depending on a ratio and/or difference between the determined display time period and the determined read time period. As an illustrative example, a written text which is shown for 3 seconds may be harder to read than the same written text shown for 10 seconds.

The one or more processors 102 may be configured to evaluate the audibility of the spoken text by determining an audibility value which represents an audibility of the spoken text. The one or more processors 102 may be configured to determine, whether the audibility value is equal to or less than a predefined audibility threshold value and, in the case that it is determined that the audibility value is equal to or less than the predefined audibility threshold value, to adapt the language skill requirement of the other-language content 110 to increase the language skill required to translate the other-language content 110 into the first language. For example, the one or more processors 102 may be configured to determine, whether the spoken text is spoken with accent and/or dialect, and to determine the audibility value such that the audibility value is decreased in the case that it is determined that the spoken text is spoken with accent and/or dialect. According to various aspects, the one or more processors 102 may be configured to implement a machine-learning model which is configured to output an audibility value responsive to inputting the portion of the audio data 108 associated with the spoken text into the machine-learning model. For example, the one or more processors 102 may be configured to determine a speaking rate of the spoken text and to determine the audibility value such that the audibility value decreases with increasing speaking rate. Hence, the faster someone is speaking, the harder spoken text may be to understand. For example, the one or more processors 102 may be configured to determine, using the audio data 108, a ratio and/or difference between a volume of the spoken text and an average volume of the video 104 and to determine the audibility value based on the ratio and/or difference between the volume of the spoken text and the average volume of the video 104. Hence, in the case that words are whispered, they may be harder to understand than speaking them loudly.

According to various aspects, the one or more processors 102 may be configured to determine (in 120), whether the language skill, ls, (or the adapted language skill as shown in FIG. 2C) of the user 300 for the second language satisfies (e.g., fulfills) the determined language skill requirement, $r_{ls}$. Hence, the language skill requirement, $r_{ls}$, may represent a language skill required to translate the other-language content 110 into the first language and the one or more processors 102 may determine, whether the user 300 has this required language skill for the second language. The one or more processors 102 may be configured to determine, in the case that it is determined that the language skill, ls, of the user 300 for the second language satisfies the determined language skill requirement, $r_{ls}$, ("Yes" in 120) to not show the subtitle when presenting the other-language content 110 of the video 104 to the user 300. The one or more processors 102 may be configured to determine, in the case that it is determined that the language skill, ls, of the user 300 for the second language does not satisfy the determined language skill requirement, $r_{ls}$, ("No" in 120) to not show the subtitle when presenting the other-language content 110 of the video 104 to the user 300. Hence, in the case that it is determined that the user 300 can translate the other-language content 110 into the first language, the subtitle may not be shown when presenting the other-language content 110 of the video 104 to the user 300, and in the case that it is determined that the user 300 cannot translate the other-language content 110 into the first language, the subtitle may be shown when presenting the other-language content 110 of the video 104 to the user 300. According to various aspects, the one or more processors 102 may be configured to provide control instructions 126 to the one or more output devices 206. The control instructions 126 may include instructions whether to show the subtitle (e.g., to display the subtitle on the display device 206) or to not show the subtitle when presenting the other-language content 110 of the video 104 to the user 300.

As described herein, the language skill requirement, $r_{ls}$, (e.g., including the adaption based on the context, the audibility and/or readability, etc.) may be determined prior to presenting the video 104 to the user 300 (e.g., via an offline pre-processing). Also, the language skill. ls, of the user 300 may be determined prior to presenting the video 104 to the user 300 (e.g., via an offline pre-processing). The one or more processors 102 may be configured to determine, whether the language skill, ls, of the user 300 for the second language satisfies the determined language skill requirement, $r_{ls}$, during presenting the video 104 to the user 300 (e.g., real-time when the user 300 watches the video 104 (e.g., responsive to detecting the user 300 from the plurality of users)).

Even though various processes are described herein as being carried by the one or more processors 102, it is understood that some of the processes may be carried out by one or more other processors (e.g., of another device separate from the system 10). As an example, the determination of the language skill requirement, $r_{ls}$, (described herein with reference to the determination 118) may be carried out on a cloud server (e.g., prior to providing the video 104 to the device 100). However, for illustration, the processes are described herein as being carried out by the one or more processors 102 of the device 100.

The system 10 may be any system which is capable to provide media, which include other-language content, to one or more users.

The system 10 may be a user device configured to provide (e.g., classical) two-dimensional media to one or more users. For example, the system 10 may be a smartphone, a tablet, a laptop, a personal computer, etc. As an illustrative example, the system 10 may be a smartphone including the one or more processors 102, a display as display (output) device 206, one or more speakers as audio (output) device 208, and/or a camera (and/or microphone) as a detection device of the one or more detection devices 400 for detecting the user (or users) using the smartphone.

As described herein, the system 10 may be an immersive technology system configured to provide immersive media to one or more users. In this case, the system 10 may be a three-dimensional (3D) TV, a head-mounted display (e.g., a virtual reality headset), or an augmented reality device (configured to provide an immersive environment taking place in the physical world with, optionally, information (e.g., objects) added virtually).

In a first example, the system 10 is a head-mounted display. The head-mounted display may include the one or more processors 102, a display as display (output) device 206, and/or a headphone as audio (output) device 208. The head-mounted display may include a camera (e.g., a face camera), a microphone, a brain-computer-interface, an eye tracking sensor, etc., as a respective detection device of the one or more detection devices 400 for detecting the (single) user using the head-mounted display. The one or more processors 102 may be configured to, in the case that it is determined that the language skill, ls, of the user 300 for the second language does not satisfy the determined language skill requirement, $r_{ls}$, control the display device 206 of the head-mounted display to display the subtitle when presenting the other-language content 110 to the user 300 wearing the head-mounted display. According to various aspects, one or more components of the head-mounted display may be employed to extend the processing scheme(s) shown in FIG. 2A to FIG. 2C, as described in the following:

According to various aspects, the language skill, ls, of the user 300 may be adapted (e.g., updated) online (i.e., during presenting the video 104 to the user 300). For example, the brain-computer-interface may be configured to detect a brain pattern of the user 300 during displaying the subtitle. The one or more processors 102 may be configured to determine, whether the detected brain pattern is associated with positive feelings or negative feelings and, in the case that it is determined that the detected brain pattern is associated with negative feelings, to adapt the language skill. Is, of the user 300 for the second language by increasing his/her language skill, ls. Illustratively, it may be determined whether the user 300 dislikes to see the subtitle and, in the case that it is determined that the user 300 dislikes to see the subtitle, it may be assumed that the user 300 has a language skill for the second language higher than the determined language skill requirement. Optionally, the microphone may capture the user 300 loudly complaining when the subtitle is shown and, based on this, it may be determined that the user 300 dislikes to see the subtitle.

Additionally or alternatively, the eye tracking sensor may be configured to detect the eye tracking data (e.g., representing an eye viewing direction of a first eye and/or a second eye of the user wearing the head-mounted display) during displaying the subtitle. The one or more processors 102 may be configured to determine, using the detected eye tracking data, whether the user 300 is looking at the subtitle when presenting the other-language content 110 or not. The one or more processors 102 may be configured to, in the case that it is determined that the user 300 is not looking at the subtitle, increase the language skill of the user 300 for the second language. Thus, in the case that the user 300 is not looking at the subtitle, it may be assumed that the user 300 is capable to translate the other-language content 110 by himself/herself.

According to various aspects, the one or more processors 102 may be configured to determine user-specifically and situation-dependent where to display the subtitle. For example, the one or more processors 102 may be configured to determine, using the detected eye tracking data, a focus depth of the first eye and/or second eye of the user 300. The one or more processors 102 may be configured to control the display device 206 to display the subtitle in an image depth corresponding to the determined focus depth when presenting the other-language content 110 of the video 104 to the user 300. Illustratively, a depth within the 3D-space may be determined into which the user 300 is currently looking and the subtitle may (in the case that it is determined to show the subtitle) then be shown in this depth. This may reduce an impact of immersive break responsive to showing the subtitle. Thus, the control instructions 126 may include information how to display the subtitle when presenting the other-language content 110 of the video 104 to the user 300.

According to various aspects, a render performance of the one or more processors 102 may be considered when deciding whether the subtitle should be shown or not. The one or more processors 102 may be associated with a (e.g., predefined) render performance threshold value representing a maximum rendering performance for rendering immersive images. Thus, the render performance threshold value may be a maximum performance for rendering the video 104 the one or more processors 102 have. The one or more processors 102 may be configured to determine a render performance value representing a render performance required to render the plurality of images 106 of the (immersive) video 104 and the subtitle within one or more images of the plurality of images 106. The one or more processors 102 may be configured to determine, whether the determined render performance value is greater than the render performance threshold value. The one or more processors 102 may be configured to, in the case that it is determined that the determined render performance value is greater than the render performance threshold value, determine to not show the subtitle when presenting the other-language content 110 of the (immersive) video 104 to the user 300. Hence, in the case that rendering the subtitle into the (immersive) video 104 may require a performance higher than the render performance threshold value, the subtitle may not be shown (e.g., independent of whether the language skill, ls, of the user 300 for the second language satisfies the determined language skill requirement, $r_{ls}$, or not).

In a second example, the system 10 is an augmented reality device, such as augmented reality glasses or a head-mounted display with video-see-through (also referred to as optical see-through). In the case of video-see-through, the head-mounted display may include one or more cameras configured to capture an environment in front of the user and the display of the head-mounted display may show the video from at least one (e.g., each) of the one or more camera or a reconstruction of the captured environment (e.g., a scene of the environment) based on camera data (as captured by at least one (e.g., each) of the one or more cameras) with additionally added virtual reality objects.

The one or more processors 102 may be configured to, in the case that it is determined that the language skill of the user for the second language does not satisfy the determined language skill requirement, determine a position at which the subtitle is to be displayed when presenting the other-language content 110 to the user 300 such that a contrast (e.g., by means of color and/or brightness) between the augmented reality and the subtitle is increased. Illustratively, colors and/or brightness of the environment in front of the user 300 may vary. This may result in that the subtitle may be hardly shown in the case that the subtitle is shown in bright regions of the environment in front of the user 300 and/or in the case that a region within the environment in front of the user 300 in which the subtitle is shown has a color similar to the color of the subtitle. Therefore, the one or more processors 102 may be configured to determine a position at which the subtitle is to be shown to increase the contrast (e.g., to increase a difference between a color value associated with the color of the subtitle and a color value associated with the color of the position and/or to increase a difference in brightness). In an example, the display device 206 of the augmented reality device may receive control instructions to show a video (e.g., video 104) on a virtual two-dimensional screen within the AR environment; in this case the one or more processors 102 may determine to show (e.g., due to low contrast within a current scene shown on the virtual two-dimensional screen) the subtitle outside (e.g., below or above) the virtual two-dimensional screen. Thus, the control instructions 126 may include information how to display the subtitle when presenting the other-language content 110 of the video 104 to the user 300.

Figure 3:
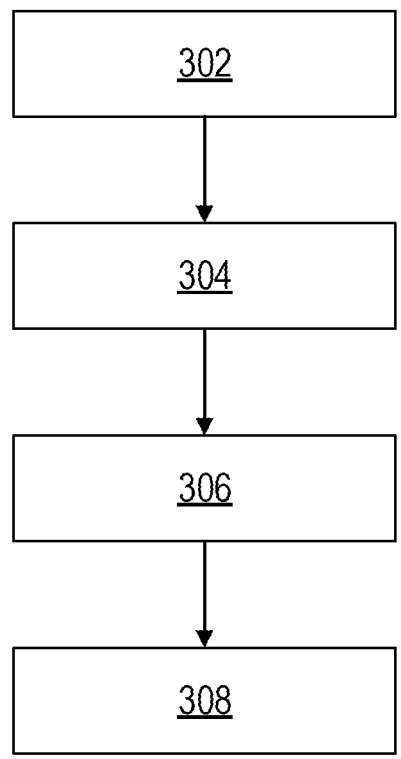
FIG. 3 shows a flow diagram of a method for selectively presenting subtitles according to various aspects.

FIG. 3 shows a flow diagram of a method 300 for selectively presenting subtitles according to various aspects.

The method 300 may include receiving a video and corresponding subtitle data (in 302). The video may include a plurality of images and corresponding audio data. The audio data may represent a first (e.g., primary) language of the video and the video may include other-language content associated with a second (e.g., secondary) language different from the first language. The subtitle data may represent a subtitle including a translation of the other-language content into the first language. The video may be configured in accordance with the video 104 described herein.

The method 300 may include determining a language skill requirement of the other-language content (in 304). The language skill requirement may represent a language skill required to translate the other-language content into the first language. The determination of the language skill requirement may be carried out as described with reference to FIG. 2A to FIG. 2C. For example, the language skill requirement of the other-language content may be determined prior to presenting the video to the user.

The method 300 may include determining, whether a language skill of a user for the second language satisfies the determined language skill requirement (in 306). The user may be detected as described herein (e.g., with reference to any of FIG. 1A to FIG. 2C). The determination of the language skill may be carried out as described with reference to FIG. 2A to FIG. 2C. The method 300 may include presenting the video to the user. The determination, whether the language skill of the user for the second language satisfies the determined language skill requirement, may be determined during presenting the video to the user.

The method 300 may include, in the case that it is determined that the language skill of the user for the second language satisfies the determined language skill requirement, determining to not show the subtitle when presenting the other-language content of the video to the user (in 308).

The method 300 may include, in the case that it is determined that the language skill of the user for the second language does not satisfy the determined language skill requirement, determining to show the subtitle when presenting the other-language content of the video to the user.

Herein, various aspects are described which allow to decrease the number of shown subtitles, consequently, can lead to a higher immersion into the consumed media. This may be ensured by determining, whether a subtitle is considered relevant or irrelevant. The herein-described principle of selectively presenting subtitles may increase an immersive experience for all kind of media which include other-language content and may consider any kind of subtitle (e.g., may be in particular useful to decrease the number of forced subtitles shown when presenting the media since forced subtitles may be generated automatically using machine-learning (without any human overseeing) such that obviously unnecessary subtitles may still be shown without the selective subtitle-presentation). It is understood that globally disabling subtitles at all may not be an option since some subtitles may be important for the user 300 to understand what is happening.

In the following, various aspects of this disclosure will be illustrated. It is noted that aspects described with reference to the device, the head-mounted display, and/or the augmented reality device may be accordingly implemented in the method and vice versa.

Example 1 is a device for selective presentation of subtitles, the device including: one or more processors configured to: receive a (e.g., immersive) video and corresponding subtitle data, wherein the video includes a plurality of (e.g., immersive) images and corresponding audio data, wherein the audio data represent a first (primary) language of the video, and wherein the video includes other-language content associated with a second (secondary) language different from the first language, wherein the subtitle data represent a subtitle including a translation of the other-language content into the first language; determine a language skill requirement of the other-language content, the language skill requirement representing a language skill required to translate the other-language content into the first language; determine, whether a language skill of a user for the second language satisfies the determined language skill requirement; and in the case that it is determined that the language skill of the user for the second language satisfies the determined language skill requirement, determine to not show the subtitle when presenting the other-language content of the video to the user.

In Example 2, the subject matter of Example 1 can optionally include that the one or more processors are further configured to determine, in the case that it is determined that the language skill of the user for the second language does not satisfy the determined language skill requirement, to show the subtitle within the video when presenting the other-language content of the video to the user.

In Example 3, the subject matter of Example 2 can optionally include that the device further includes a display device configured to display the plurality of images of the video and the subtitle in accordance with the subtitle data; wherein the one or more processors are configured to: in the case that it is determined to show the subtitle, control the display device to display the subtitle when presenting the other-language content (e.g., via the display device and/or the audio device) of the video to the user; and in the case that it is determined to not show the subtitle, control the display device to not display the subtitle when presenting the other-language content (e.g., via the display device and/or the audio device) of the video to the user.

In Example 4, the subject matter of Example 3 can optionally include that the display device is configured such that the plurality of images of the video and the subtitle can be presented to two or more users (e.g., the device may be a smartphone, a tablet, a laptop, etc.); wherein the device includes a camera configured to detect a viewer image showing one or more users viewing the display device; wherein the one or more processors are configured to: determine, whether the viewing image shows two or more users viewing the display device, in the case that it is determined that the viewing image shows two or more users viewing the display device, determine for each user of the two or more users, whether a language skill of a respective user for the second language satisfies the determined language skill requirement, and in the case that it is determined that the respective language skill of each user of the two or more users satisfies the determined language skill requirement, determine to not show the subtitle when presenting the other-language content of the video.

In Example 5, the subject matter of any one of Examples 1 to 4 can optionally include that the one or more processors are configured to: receive user profile data of the user, wherein the user profile data define the language skill of the user for the second language.

In Example 6, the subject matter of Example 5 can optionally include that the user profile data are provided by the user (e.g., via an input device).

In Example 7, the device of any one of Examples 1 to 4 can optionally further include: an output device configured to provide instructions (e.g., visually and/or audibly) to the user which instruct the user to speak in the second language (e.g., to read aloud a text given in the second language and/or to have a conversation in the second language); and a microphone configured to acquire voice information by capturing audio of the speaking user; wherein the one or more processors are configured to determine the language skill of the user for the second language using the acquired voice information (e.g., using a machine-learning model).

In Example 8, the subject matter of any one of Examples 5 to 7 can optionally include that the user profile data further define a language skill of the user for a third language different from but similar to the second language; wherein the one or more processors are configured to adapt the language skill of the user for the second language based on the language skill of the user for the third language.

In Example 9, the subject matter of any one of Examples 1 to 8 can optionally include that the one or more processors are configured to: receive location information of a device (e.g., global positioning system, GPS, data of a user device (e.g., a smartphone, a tablet, a laptop, etc.)) associated with the user; determine, whether the location information include a location within a country in which the second language is an official language; and in the case that it is determined that the location information include a location within a country in which the second language is an official language, increase the language skill of the user for the second language.

In Example 10, the subject matter of any one of Examples 1 to 9 can optionally include that the one or more processors are configured to: receive a web browsing history of a device (e.g., a smartphone, a tablet, a laptop, a head-mounted display, etc.) associated with the user; determine, whether one or more webpages of the web browsing history are in the second language; and in the case that it is determined that one or more webpages of the web browsing history are in the second language, increase the language skill of the user for the second language.

In Example 11, the subject matter of any one of Examples 1 to 10 can optionally include that the one or more processors are configured to determine the user from a plurality of users using: a user profile with which the user is logged in at the device; and/or an image showing at least a part of the user, wherein the device includes a camera configured to captured the image of the user using the device; and/or brain data of the user, wherein the device includes a brain-computer-interface configured to detect the brain data of the user; and/or biometric data of the user, wherein the device includes a biometric sensor (e.g., a fingerprint sensor, a camera sensor for facial authentication, an iris sensor, a voice recognition sensor, etc.) configured to detect the biometric data of the user; and/or information regarding a wireless network connection between the device and another device.

In Example 12, the subject matter of any one of Examples 1 to 11 can optionally include that the other-language content includes one or more words in the second language; wherein the one or more processors are configured to: determine a respective word translation level for each word of the one or more words of the other-language content, wherein the respective word translation level represents a language skill required to translate the word into the first language, and determine the language skill requirement of the other-language content using the determined word translation levels.

In Example 13, the subject matter of Example 12 can optionally include that the one or more processors are configured to: determine a translation of at least one word of the one or more words into the first language using the subtitle data; determine a similarity value representing a similarity between the at least one word and its translation; determine, whether the similarity value is equal to or greater than a predefined similarity threshold value; in the case that it is determined that the similarity value is equal to or greater than the predefined similarity threshold value, adapt the word translation level determined for the at least one word to reduce the language skill required to translate the at least one word into the first language; and determine the language skill requirement of the other-language content using the adapted word translation level.

In Example 14, the subject matter of Example 13 can optionally include that the one or more processors are configured to determine the similarity value in consideration of one or more synonyms of the translation of at least one word.

In Example 15, the subject matter of any one of Examples 12 to 14 can optionally include that the other-language content includes at least one sentence consisting of a plurality of words in the second language, wherein the plurality of words includes the one or more words; and wherein the one or more processors are configured to: determine a respective word translation level for each word of the plurality of words, determine a tense of the at least one sentence, determine a sentence translation level of the at least one sentence using the determined word translation levels and the determined tense of the at least one sentence, wherein the sentence translation level represents a language skill required to translate the at least one sentence into the first language, and determine the language skill requirement of the other-language content using the determined sentence translation level.

In Example 16, the subject matter of any one of Examples 1 to 15 can optionally include that one or more images of the plurality of images of the video include written text as the other-language content and wherein the subtitle includes a translation of the written text into the first language; and/or wherein a portion of the audio data represents spoken text as the other-language content and wherein the subtitle includes a translation of the spoken text into the first language.

In Example 17, the subject matter of any one of Examples 1 to 16 can optionally include that the one or more processors are configured to: adapt the language skill requirement of the other-language content; and determine to not show the subtitle when presenting the other-language content of the video to the user in the case that the language skill of the user for the second language satisfies the adapted language skill requirement.

In Example 18, the subject matter of Example 17 can optionally include that the other-language content is associated with a scene of the video (e.g., represented by one or more images of the plurality of images and/or audio information associated with the audio data); and wherein the one or more processors are configured to: determine a context of the scene, determine a subtitle relevance using the other-language content and the context of the scene, wherein the subtitle relevance indicates, whether the context of the scene reduces the language skill required to translate the other-language content into the first language, and in the case that the subtitle relevance indicates that the context of the scene reduces the language skill required to translate the other-language content into the first language, adapt the language skill requirement of the other-language content to reduce the language skill required to translate the other-language content into the first language.

In Example 19, the subject matter of Example 17 or 18 can optionally include that the one or more processors are configured to: determine whether characters of the second language correspond to characters of the first language; and in the case that it is determined that the characters of the second language do not correspond to the characters of the first language, adapt the language skill requirement to increase the language skill required to translate the other-language content into the first language.

In Example 20, the subject matter of any one of Examples 17 to 19 can optionally include that one or more images of the plurality of images of the video include written text as the other-language content and wherein the subtitle includes a translation of the written text into the first language; and wherein the one or more processors are configured to: determine a readability value representing a readability of the written text, determine, whether the readability value is equal to or less than a predefined readability threshold value, and in the case that it is determined that the readability value is equal to or less than the predefined readability threshold value, adapt the language skill requirement of the other-language content to increase the language skill required to translate the other-language content into the first language.

In Example 21, the subject matter of Example 20 can optionally include that the one or more processors are configured to determine the readability value using a font size of the written text, wherein the readability value increases with increasing font size.

In Example 22, the subject matter of Examples 3 and 21 can optionally include that the one or more processors are configured to: determine a size of the display device; and determine the readability value using the font size of the written text and the determined size of the display device.

In Example 23, the subject matter of any one of Examples 20 to 22 can optionally include that the one or more processors are configured to: determine, whether the user is visually impaired (e.g., by detecting a face image of the user and determining, whether the user wears glasses; and/or wherein user profile data include information indicating whether the user is visually impaired); and determine the readability value such that the readability value is decreased in the case that it is determined that the user is visually impaired.

In Example 24, the subject matter of any one of Examples 20 to 23 can optionally include that the one or more processors are configured to determine the readability value using a font style of the written text, wherein the readability value decreases in the case that the font style is italics.

In Example 25, the subject matter of any one of Examples 20 to 24 can optionally include that the one or more processors are configured to: determine, whether the written text is handwritten; and determine the readability value such that the readability value is decreased in the case that it is determined that the written text is handwritten.

In Example 26, the subject matter of any one of Examples 20 to 25 can optionally include that the one or more processors are configured to: apply optical character detection, OCR, on the written text to determine an optical character detected text and an optical character detection value (e.g., a confidence value) representing a difficulty of detecting the optical character detected text; and determine the readability value such that the readability value decreases with increasing difficulty of detecting the optical character detected text.

In Example 27, the subject matter of any one of Examples 20 to 26 can optionally include that the one or more processors are configured to: determine an image number of the one or more images; determine, using the determined image number and a frame rate (e.g., in frames per second) of the video, a display time period representing a time period for which the written text will be displayed when presenting the other-language content to the user; determine a read time period required to read the written text; and determine the readability value depending on a ratio and/or difference between the determined display time period and the determined read time period.

In Example 28, the subject matter of any one of Examples 17 to 27 can optionally include that a portion of the audio data represents spoken text as the other-language content and wherein the subtitle includes a translation of the spoken text into the first language; and wherein the one or more processors are configured to: determine an audibility value representing an audibility of the spoken text, determine, whether the audibility value is equal to or less than a predefined audibility threshold value, and in the case that it is determined that the audibility value is equal to or less than the predefined audibility threshold value, adapt the language skill requirement of the other-language content to increase the language skill required to translate the other-language content into the first language.

In Example 29, the subject matter of Example 28 can optionally include that the one or more processors are configured to: determine, whether the spoken text is spoken with accent and/or dialect; and determine the audibility value such that the audibility value is decreased in the case that it is determined that the spoken text is spoken with accent and/or dialect.

In Example 30, the subject matter of Example 28 or 29 can optionally include that the one or more processors are configured to: determine a speaking rate of the spoken text; and determine the audibility value such that the audibility value decreases with increasing speaking rate.

In Example 31, the subject matter of any one of Examples 28 to 30 can optionally include that the one or more processors are configured to: determine, using the audio data, a ratio and/or difference between a volume of the spoken text and an average volume of the video; and determine the audibility value based on the ratio and/or difference between the volume of the spoken text and the average volume of the video.

Example 32 is a head-mounted display (e.g., a virtual reality headset) for presenting immersive media to a user, the head-mounted display including: the device according to any one of Examples 1 to 31, wherein the video is an immersive video; and a display device configured to display the plurality of images of the immersive video and the subtitle in accordance with the subtitle data.

In Example 33, the head-mounted display of Example 32 can optionally further include: an audio device configured to output audio in accordance with the audio data (e.g., to the user wearing the head-mounted display).

In Example 34, the head-mounted display of Example 32 or 33 can optionally further include: a detection device configured to detect a user wearing the head-mounted display, wherein the one or more processors of the device are configured to determine, whether a language skill of the detected user for the second language satisfies the determined language skill requirement.

In Example 35, the subject matter of Example 34 can optionally include that the detection device includes a camera which is configured to detect, when the user wears the head-mounted display, a face image of a face of the user, and wherein the one or more processors of the device are configured to determine the user from a plurality of users using the detected face image.

In Example 36, the subject matter of Example 34 or 35 can optionally include that the detection device includes a brain-computer-interface which is configured to detect, when the user wears the head-mounted display, a brain pattern of the user.

In Example 37, the subject matter of Example 36 can optionally include that the one or more processors of the device are configured to determine the user from a plurality of users using the detected brain pattern.

In Example 38, the subject matter of Example 36 or 37 can optionally include that in the case that it is determined that the language skill of the user for the second language does not satisfy the determined language skill requirement: the one or more processors of the device are configured to control the display device to display the subtitle when presenting the other-language content (e.g., via the display device and/or the audio device) of the immersive video to the user wearing the head-mounted display; the brain-computer-interface is configured to detect a brain pattern of the user during displaying the subtitle; and the one or more processors of the device are configured to determine, whether the detected brain pattern is associated with positive feelings or negative feelings and, in the case that it is determined that the detected brain pattern is associated with negative feelings, to increase the language skill of the user for the second language.

In Example 39, the head-mounted display of any one of Examples 32 to 38 can optionally further include: an eye tracking sensor configured to detect eye tracking data representing an eye viewing direction of a first eye and/or a second eye of the user wearing the head-mounted display.

In Example 40, the subject matter of Example 39 can optionally include that, in the case that it is determined that the language skill of the user for the second language does not satisfy the determined language skill requirement, the one or more processors of the device are configured to: determine a focus depth of the first eye and/or second eye of the user using the detected eye tracking data, and control the display device to display the subtitle in an image depth corresponding to the determined focus depth when presenting the other-language content (e.g., via the display device and/or the audio device) of the video to the user.

In Example 41, the subject matter of Example 39 or 40 can optionally include that, in the case that it is determined that the language skill of the user for the second language does not satisfy the determined language skill requirement, the one or more processors of the device are configured to: control the display device to display the subtitle when presenting the other-language content (e.g., via the display device and/or the audio device) of the immersive video to the user wearing the head-mounted display; determine, using the detected eye tracking data, whether the user is looking at the subtitle when presenting the other-language content; and in the case that it is determined that the user is not looking at the subtitle, increase the language skill of the user for the second language.

In Example 42, the subject matter of any one of Examples 32 to 41 can optionally include that the one or more processors are configured to determine the user from a plurality of users using: a user profile with which the user is logged in at the device (e.g., a user profile of a smartphone, a tablet, or a laptop; and/or a user profile of an application (e.g., an app) implemented by the one or more processors); and/or an image showing at least a part of the user, wherein the device includes a camera configured to captured the image of the user using the device; and/or brain data of the user, wherein the device includes a brain-computer-interface configured to detect the brain data of the user; and/or biometric data of the user, wherein the device includes a biometric sensor (e.g., a fingerprint sensor, a camera sensor for facial authentication, an iris sensor, a voice recognition sensor, etc.) configured to detect the biometric data of the user; and/or information regarding a wireless network connection between the device and another device.

In Example 43, the subject matter of any one of Examples 32 to 42 can optionally include that the one or more processors of the device are associated with a render performance threshold value representing a maximum rendering performance for rendering immersive images; and wherein the one or more processors of the device are configured to: determine a render performance value representing a render performance required to render the plurality of images of the immersive video and the subtitle within one or more images of the plurality of images, determine, whether the determined render performance value is greater than the render performance threshold value, and in the case that it is determined that the determined render performance value is greater than the render performance threshold value, determine to not show the subtitle when presenting the other-language content of the immersive video to the user (independent of whether the language skill of the user for the second language satisfies the determined language skill requirement).

Example 44 is a method for selectively presenting subtitles, the method including: receiving a video and corresponding subtitle data, wherein the video includes a plurality of images and corresponding audio data, wherein the audio data represent a first (primary) language of the video, and wherein the video includes other-language content associated with a second (secondary) language different from the first language, wherein the subtitle data represent a subtitle including a translation of the other-language content into the first language; determining a language skill requirement of the other-language content, the language skill requirement representing a language skill required to translate the other-language content into the first language; determining, whether a language skill of a user for the second language satisfies the determined language skill requirement; and in the case that it is determined that the language skill of the user for the second language satisfies the determined language skill requirement, determining to not show the subtitle when presenting the other-language content of the video to the user.

In Example 45, the method of Example 1 can optionally further include: determining, in the case that it is determined that the language skill of the user for the second language does not satisfy the determined language skill requirement, to show the subtitle within the video when presenting the other-language content of the video to the user.

In Example 46, the method of Example 44 or 45 can optionally further include: detecting a viewer image showing one or more users viewing a display device on which the video is to be presented; determining, whether the viewing image shows two or more users viewing the display device; in the case that it is determined that the viewing image shows two or more users viewing the display device, determining for each user of the two or more users, whether a language skill of a respective user for the second language satisfies the determined language skill requirement; and in the case that it is determined that the respective language skill of each user of the two or more users satisfies the determined language skill requirement, determining to not show the subtitle when presenting the other-language content of the video.

In Example 46, the method of any one of Example 44 to 46 can optionally further include: receiving user profile data of the user, wherein the user profile data define the language skill of the user for the second language.

In Example 48, the subject matter of Example 47 can optionally include that the user profile data are provided by the user (e.g., via an input device).

In Example 49, the method of any one of Examples 44 to 46 can optionally further include: providing instructions (e.g., visually and/or audibly) to the user which instruct the user to speak in the second language (e.g., to read aloud a text given in the second language and/or to have a conversation in the second language); acquiring voice information by capturing audio of the speaking user; and determining the language skill of the user for the second language using the acquired voice information (e.g., using a machine-learning model).

In Example 50, the subject matter of any one of Examples 47 to 49 can optionally include that the user profile data further define a language skill of the user for a third language different from but similar to the second language; wherein the method further includes adapting the language skill of the user for the second language based on the language skill of the user for the third language.

In Example 51, the method of any one of Examples 44 to 50 can optionally further include: receiving location information of a device (e.g., global positioning system, GPS, data of a user device (e.g., a smartphone, a tablet, a laptop, etc.)) associated with the user; determining, whether the location information include a location within a country in which the second language is an official language; and in the case that it is determined that the location information include a location within a country in which the second language is an official language, increasing the language skill of the user for the second language.

In Example 52, the method of any one of Examples 44 to 51 can optionally further include: receiving a web browsing history of a device (e.g., a smartphone, a tablet, a laptop, a head-mounted display, etc.) associated with the user; determining, whether one or more webpages of the web browsing history are in the second language; and in the case that it is determined that one or more webpages of the web browsing history are in the second language, increasing the language skill of the user for the second language.

In Example 53, the method of any one of Examples 44 to 52 can optionally further include: determining the user from a plurality of users using: a user profile with which the user is logged in at the device; and/or an image showing at least a part of the user, wherein the device includes a camera configured to captured the image of the user using the device; and/or brain data of the user, wherein the device includes a brain-computer-interface configured to detect the brain data of the user; and/or biometric data of the user, wherein the device includes a biometric sensor (e.g., a fingerprint sensor, a camera sensor for facial authentication, an iris sensor, a voice recognition sensor, etc.) configured to detect the biometric data of the user; and/or information regarding a wireless network connection between the device and another device.

In Example 54, the subject matter of any one of Examples 44 to 53 can optionally include that the other-language content includes one or more words in the second language; wherein the method further includes: determining a respective word translation level for each word of the one or more words of the other-language content, wherein the respective word translation level represents a language skill required to translate the word into the first language, and determining the language skill requirement of the other-language content using the determined word translation levels.

In Example 55, the method of Example 54 can optionally further include: determining a translation of at least one word of the one or more words into the first language using the subtitle data; determining a similarity value representing a similarity between the at least one word and its translation; determining, whether the similarity value is equal to or greater than a predefined similarity threshold value; in the case that it is determined that the similarity value is equal to or greater than the predefined similarity threshold value, adapting the word translation level determined for the at least one word to reduce the language skill required to translate the at least one word into the first language; and determining the language skill requirement of the other-language content using the adapted word translation level.

In Example 56, the subject matter of Example 55 can optionally include that the similarity value is determined in consideration of one or more synonyms of the translation of at least one word.

In Example 57, the subject matter of any one of Examples 54 to 56 can optionally include that the other-language content includes at least one sentence consisting of a plurality of words in the second language, wherein the plurality of words includes the one or more words; and wherein the method further includes: determining a respective word translation level for each word of the plurality of words, determining a tense of the at least one sentence, determining a sentence translation level of the at least one sentence using the determined word translation levels and the determined tense of the at least one sentence, wherein the sentence translation level represents a language skill required to translate the at least one sentence into the first language, and determining the language skill requirement of the other-language content using the determined sentence translation level.

In Example 58, the subject matter of any one of Examples 44 to 57 can optionally include that one or more images of the plurality of images of the video include written text as the other-language content and wherein the subtitle includes a translation of the written text into the first language; and/or wherein a portion of the audio data represents spoken text as the other-language content and wherein the subtitle includes a translation of the spoken text into the first language.

In Example 59, the method of any one of Examples 44 to 58 can optionally further include: adapting the language skill requirement of the other-language content; and determining to not show the subtitle when presenting the other-language content of the video to the user in the case that the language skill of the user for the second language satisfies the adapted language skill requirement.

In Example 60, the subject matter of Example 59 can optionally include that the other-language content is associated with a scene of the video (e.g., represented by one or more images of the plurality of images and/or audio information associated with the audio data); and wherein the method further includes: determining a context of the scene, determining a subtitle relevance using the other-language content and the context of the scene, wherein the subtitle relevance indicates, whether the context of the scene reduces the language skill required to translate the other-language content into the first language, and in the case that the subtitle relevance indicates that the context of the scene reduces the language skill required to translate the other-language content into the first language, adapting the language skill requirement of the other-language content to reduce the language skill required to translate the other-language content into the first language.

In Example 61, the method of Example 59 or 60 can optionally further include: determining, whether characters of the second language correspond to characters of the first language; and in the case that it is determined that the characters of the second language do not correspond to the characters of the first language, adapting the language skill requirement to increase the language skill required to translate the other-language content into the first language.

In Example 62, the subject matter of any one of Examples 59 to 61 can optionally include that one or more images of the plurality of images of the video include written text as the other-language content and wherein the subtitle includes a translation of the written text into the first language; and wherein the method further includes: determining a readability value representing a readability of the written text, determining, whether the readability value is equal to or less than a predefined readability threshold value, and in the case that it is determined that the readability value is equal to or less than the predefined readability threshold value, adapting the language skill requirement of the other-language content to increase the language skill required to translate the other-language content into the first language.

In Example 63, the subject matter of Example 62 can optionally include that the readability value is determined using a font size of the written text, wherein the readability value increases with increasing font size.

In Example 64, the method of Example 63 can optionally further include: determining a size of a display device on which the video is to be presented; and wherein the readability value is determined using the font size of the written text and the determined size of the display device.

In Example 65, the method of any one of Examples 62 to 64 can optionally further include: determining, whether the user is visually impaired (e.g., by detecting a face image of the user and determining, whether the user wears glasses; and/or wherein user profile data include information indicating whether the user is visually impaired); and wherein the readability value is determined such that the readability value is decreased in the case that it is determined that the user is visually impaired.

In Example 66, the subject matter of any one of Examples 62 to 65 can optionally include that the readability value is determined using a font style of the written text, wherein the readability value decreases in the case that the font style is italics.

In Example 67, the method of any one of Examples 62 to 66 can optionally further include: determining, whether the written text is handwritten; and wherein the readability value is determined such that the readability value is decreased in the case that it is determined that the written text is handwritten.

In Example 68, the method of any one of Examples 62 to 67 can optionally further include: applying optical character detection, OCR, on the written text to determine an optical character detected text and an optical character detection value (e.g., a confidence value) representing a difficulty of detecting the optical character detected text; and wherein the readability value is determined such that the readability value decreases with increasing difficulty of detecting the optical character detected text.

In Example 69, the method of any one of Examples 62 to 68 can optionally further include: determining an image number of the one or more images; determining, using the determined image number and a frame rate (e.g., in frames per second) of the video, a display time period representing a time period for which the written text will be displayed when presenting the other-language content to the user, determining a read time period required to read the written text; and wherein the readability value is determined depending on a ratio and/or difference between the determined display time period and the determined read time period.

In Example 70, the subject matter of any one of Examples 59 to 69 can optionally include that a portion of the audio data represents spoken text as the other-language content and wherein the subtitle includes a translation of the spoken text into the first language; and wherein the method further includes: determining an audibility value representing an audibility of the spoken text, determining, whether the audibility value is equal to or less than a predefined audibility threshold value, and in the case that it is determined that the audibility value is equal to or less than the predefined audibility threshold value, adapting the language skill requirement of the other-language content to increase the language skill required to translate the other-language content into the first language.

In Example 71, the method of Example 70 can optionally further include: determining, whether the spoken text is spoken with accent and/or dialect; wherein the audibility value is determined such that the audibility value is decreased in the case that it is determined that the spoken text is spoken with accent and/or dialect.

In Example 72, the method of Example 70 or 71 can optionally further include: determining a speaking rate of the spoken text; wherein the audibility value is determined such that the audibility value decreases with increasing speaking rate.

In Example 73, the method of any one of Examples 70 to 72 can optionally further include: determining, using the audio data, a ratio and/or difference between a volume of the spoken text and an average volume of the video; wherein the audibility value is determined based on the ratio and/or difference between the volume of the spoken text and the average volume of the video.

In Example 74, the method of any one of Examples 44 to 73 can optionally further include: detecting, using a head-mounted display, a face image of a face of the user while the user wears the head-mounted display; and determining the user from a plurality of users using the detected face image.

In Example 75, the subject matter of any one of Examples 44 to 74 can optionally include that, in the case that it is determined that the language skill of the user for the second language does not satisfy the determined language skill requirement, the method further includes: controlling a display device to display the subtitle when presenting the other-language content (e.g., via the display device and/or the audio device) of the immersive video to the user wearing a head-mounted display; detecting, using brain-computer-interface, a brain pattern of the user during displaying the subtitle; determining, whether the detected brain pattern is associated with positive feelings or negative feelings; and in the case that it is determined that the detected brain pattern is associated with negative feelings, increasing the language skill of the user for the second language.

In Example 76, the method of any one of Examples 44 to 75 can optionally further include: wherein, in the case that it is determined that the language skill of the user for the second language does not satisfy the determined language skill requirement, the method further includes: determining, using eye tracking data which represent an eye viewing direction of a first eye and/or a second eye of the user, a focus depth of the first eye and/or second eye of the user, and controlling a display device to display the subtitle in an image depth corresponding to the determined focus depth when presenting the other-language content (e.g., via the display device and/or the audio device) of the video to the user.

In Example 77, the method of any one of Examples 44 to 76 can optionally further include: wherein, in the case that it is determined that the language skill of the user for the second language does not satisfy the determined language skill requirement, the method further includes: controlling a display device to display the subtitle when presenting the other-language content (e.g., via the display device and/or the audio device) of the immersive video to the user; determining, using eye tracking data which represent an eye viewing direction of a first eye and/or a second eye of the user, whether the user is looking at the subtitle when presenting the other-language content; and in the case that it is determined that the user is not looking at the subtitle, increasing the language skill of the user for the second language.

In Example 78, the subject matter of any one of Examples 44 to 77 can optionally include that are associated with a render performance threshold value representing a maximum rendering performance for rendering immersive images; and wherein the method further includes: determining a render performance value representing a render performance required to render the plurality of images of the video and the subtitle within one or more images of the plurality of images, determining, whether the determined render performance value is greater than a render performance threshold value, wherein the render performance threshold value represents a maximum rendering performance of one or more processors of a device via which the video is to be presented, and in the case that it is determined that the determined render performance value is greater than the render performance threshold value, determining to not show the subtitle when presenting the other-language content of the immersive video to the user (independent of whether the language skill of the user for the second language satisfies the determined language skill requirement).

In Example 79, the subject matter of any one of Examples 44 to 78 can optionally include that the language skill requirement of the other-language content is determined prior to presenting the video to the user.

In Example 80, the method of any one of Examples 44 to 79 can optionally further include: presenting the video to the user; wherein, whether the language skill of the user for the second language satisfies the determined language skill requirement, is determined during presenting the video to the user.

Example 81 is an augmented reality device (e.g., smart glasses, augmented reality glasses, a head-mounted display with video-see-through, etc.) for presenting augmented reality to a user, the augmented reality device including: the device according to any one of Examples 1 to 31; wherein the video is an immersive video for augmented reality; and a display device configured to display augmented reality including the immersive video within a surrounding of the user and to display the subtitle.

In Example 82, the subject matter of Example 81 can optionally include that, in the case that it is determined that the language skill of the user for the second language does not satisfy the determined language skill requirement, the one or more processors of the device are configured to: determine a position at which the subtitle is to be displayed when presenting the other-language content to the user such that a contrast (e.g., by means of color and/or brightness) between the augmented reality and the subtitle is increased.

According to various aspects, the augmented reality device may be, where applicable, configured to in accordance with the head-mounted display of any one of Examples 32 to 43.

Example 83 is a non-transitory computer-readable medium having instructions recorded thereon which, when executed by one or more processors, cause the one or more processors to carry out the method according to any one of Examples 44 to 80.

Although the disclosure refers to (e.g., immersive) videos, the above described principles may analogously apply to other media, such as games, apps, slideshows, museum tours, live captioning (i.e., live subtitles during a conversation, a phone call, etc.), and the like. Hence, a game, an app, a slideshow, etc. may include main content in the first language and other-language content in the second language, and it may be determined, whether the language skill of the user for the second language satisfies a language skill requirement of the other-language content, in order to determine, whether subtitles are to be presented to the user. The principles may also apply other use cases which may lower an immersive experience, such as showing emoji symbols for users having trouble to understand emotions from facial expressions. In this case, the one or more processors 102 may be configured to determine to not show (e.g., to skip) an emoji (thereby increasing the immersive experience) in the case that an understanding of this emoji is determined as being very obvious even for people usually having problems understanding emotions.

Although various aspects are described with respect to the selective presentation of subtitles for other-language content, it is understood that the principles apply analogously to a selective presentation of captions. Hence, in this case, the subtitle data (e.g., subtitle data 112), as described herein, may be caption data. Captions may differentiate from subtitles in that captions refer to text which represents the audio data (e.g., for hearing-impaired users), whereas subtitles refer to text which represents a translation of the other-language content. Thus, captions may refer to all audio objects within the audio data, such as spoken text, background sounds, sounds from devices, etc. A caption may also be referred to as a (e.g., closed) caption subtitle. Therefore, it is understood that the subtitle for other-language content, as described herein, may also be a caption subtitle representing the audio data.

What is claimed is:

1. A device for selective presentation of subtitles, the device comprising:
   one or more processors configured to:
   receive a video and corresponding subtitle data, wherein the video comprises a plurality of images and corresponding audio data, wherein the audio data represent a first language of the video, and wherein the video comprises other-language content associated with a second language different from the first language, wherein the subtitle data represent a subtitle comprising a translation of the other-language content into the first language;
   determine a language skill requirement of the other-language content, the language skill requirement representing a language skill required to translate the other-language content into the first language;

determine, whether a language skill of a user for the second language satisfies the determined language skill requirement; and in the case that it is determined that the language skill of the user for the second language satisfies the determined language skill requirement, determine to not show the subtitle when presenting the other-language content of the video to the user, wherein the other-language content is associated with a scene of the video;

wherein the one or more processors are configured to:

determine a context of the scene, determine a subtitle relevance using the other-language content and the context of the scene, wherein the subtitle relevance indicates, whether the context of the scene reduces the language skill required to translate the other-language content into the first language, in the case that the subtitle relevance indicates that the context of the scene reduces the language skill required to translate the other-language content into the first language, adapt the language skill requirement of the other-language content to reduce the language skill required to translate the other-language content into the first language, and determine to not show the subtitle when presenting the other-language content of the video to the user in the case that the language skill of the user for the second language satisfies the adapted language skill requirement.

2. The device according to claim 1, wherein the device further comprises a display device configured to display the plurality of images of the video and the subtitle in accordance with the subtitle data;

wherein the one or more processors are configured to:

determine, in the case that it is determined that the language skill of the user for the second language does not satisfy the determined language skill requirement, to show the subtitle within the video when presenting the other-language content of the video to the user;

in the case that it is determined to show the subtitle, control the display device to display the subtitle when presenting the other-language content of the video to the user; and in the case that it is determined to not show the subtitle, control the display device to not display the subtitle when presenting the other-language content of the video to the user.

3. The device according to claim 2, wherein the display device is configured such that the plurality of images of the video and the subtitle can be presented to two or more users;

wherein the device comprises a camera configured to detect a viewer image showing one or more users viewing the display device;

wherein the one or more processors are configured to:

determine, whether the viewing image shows two or more users viewing the display device, in the case that it is determined that the viewing image shows two or more users viewing the display device, determine for each user of the two or more users, whether a language skill of a respective user for the second language satisfies the determined language skill requirement, and in the case that it is determined that the respective language skill of each user of the two or more users satisfies the determined language skill requirement, determine to not show the subtitle when presenting the other-language content of the video.

4. The device according to claim 1, wherein the one or more processors are configured to receive user profile data of the user, wherein the user profile data define the language skill of the user for the second language; or wherein the device further comprises:

an output device configured to provide instructions to the user which instruct the user to speak in the second language; and a microphone configured to acquire voice information by capturing audio of the speaking user;

wherein the one or more processors are configured to determine the language skill of the user for the second language using the acquired voice information.

5. The device according to claim 1, wherein the one or more processors are configured to determine the user from a plurality of users using:

a user profile with which the user is logged in at the device; and/or an image showing at least a part of the user, wherein the device comprises a camera configured to captured the image of the user using the device; and/or brain data of the user, wherein the device comprises a brain-computer-interface configured to detect the brain data of the user; and/or biometric data of the user, wherein the device comprises a biometric sensor configured to detect the biometric data of the user; and/or information regarding a wireless network connection between the device and another device.

6. The device according to claim 1, wherein one or more images of the plurality of images of the video comprise written text as the other-language content and wherein the subtitle comprises a translation of the written text into the first language; and/or wherein a portion of the audio data represents spoken text as the other-language content and wherein the subtitle comprises a translation of the spoken text into the first language.

7. The device according to claim 1, wherein one or more images of the plurality of images of the video comprise written text as the other-language content and wherein the subtitle comprises a translation of the written text into the first language; and wherein the one or more processors are configured to:

determine a readability value representing a readability of the written text, determine, whether the readability value is equal to or less than a predefined readability threshold value, in the case that it is determined that the readability value is equal to or less than the predefined readability threshold value, adapt the language skill requirement of the other-language content to increase the language skill required to translate the other-language content into the first language, and determine to show the subtitle when presenting the other-language content of the video to the user in the case that the language skill of the user for the second language does not satisfy the adapted language skill requirement.

8. The device according to claim 7, wherein the one or more processors are configured to:

determine, whether the user is visually impaired; and determine the readability value such that the readability value is decreased in the case that it is determined that the user is visually impaired.

9. The device according to claim 1,
wherein a portion of the audio data represents spoken text as the other-language content and wherein the subtitle comprises a translation of the spoken text into the first language; and
wherein the one or more processors are configured to:
determine an audibility value representing an audibility of the spoken text,
determine, whether the audibility value is equal to or less than a predefined audibility threshold value,
in the case that it is determined that the audibility value is equal to or less than the predefined audibility threshold value, adapt the language skill requirement of the other-language content to increase the language skill required to translate the other-language content into the first language, and
determine to show the subtitle when presenting the other-language content of the video to the user in the case that the language skill of the user for the second language does not satisfy the adapted language skill requirement.

10. A device for selective presentation of subtitles, the device comprising:
one or more processors configured to:
receive a video and corresponding subtitle data, wherein the video comprises a plurality of images and corresponding audio data, wherein the audio data represent a first language of the video, and wherein the video comprises other-language content associated with a second language different from the first language, wherein the subtitle data represent a subtitle comprising a translation of the other-language content into the first language;
determine a language skill requirement of the other-language content, the language skill requirement representing a language skill required to translate the other-language content into the first language;
determine, whether a language skill of a user for the second language satisfies the determined language skill requirement; and
in the case that it is determined that the language skill of the user for the second language satisfies the determined language skill requirement, determine to not show the subtitle when presenting the other-language content of the video to the user,
wherein the other-language content comprises one or more words in the second language;
wherein the one or more processors are configured to:
determine a respective word translation level for each word of the one or more words of the other-language content, wherein the respective word translation level represents a language skill required to translate the word into the first language, and
determine the language skill requirement of the other-language content using the determined word translation levels.

11. The device according to claim 10,
wherein the other-language content comprises at least one sentence consisting of a plurality of words in the second language, wherein the plurality of words comprises the one or more words; and
wherein the one or more processors are configured to:
determine a respective word translation level for each word of the plurality of words,
determine a tense of the at least one sentence,
determine a sentence translation level of the at least one sentence using the determined word translation levels and the determined tense of the at least one sentence, wherein the sentence translation level represents a language skill required to translate the at least one sentence into the first language, and
determine the language skill requirement of the other-language content using the determined sentence translation level.

12. A head-mounted display for presenting immersive media to a user, the head-mounted display comprising:
a device comprising one or more processors configured to:
receive an immersive video and corresponding subtitle data, wherein the immersive video comprises a plurality of images and corresponding audio data, wherein the audio data represent a first language of the immersive video, and wherein the immersive video comprises other-language content associated with a second language different from the first language, wherein the subtitle data represent a subtitle comprising a translation of the other-language content into the first language;
determine a language skill requirement of the other-language content, the language skill requirement representing a language skill required to translate the other-language content into the first language;
determine, whether a language skill of a user for the second language satisfies the determined language skill requirement; and
in the case that it is determined that the language skill of the user for the second language satisfies the determined language skill requirement, determine to not show the subtitle when presenting the other-language content of the immersive video to the user;
a display device configured to display the plurality of images of the immersive video and the subtitle in accordance with the subtitle data; and
a detection device configured to detect a user wearing the head-mounted display, wherein the one or more processors of the device are configured to determine, whether a language skill of the detected user for the second language satisfies the determined language skill requirement,
wherein the detection device comprises a camera which is configured to detect, when the user wears the head-mounted display, a face image of a face of the user, and wherein the one or more processors of the device are configured to determine the user from a plurality of users using the detected face image; and/or
wherein the detection device comprises a brain-computer-interface which is configured to detect, when the user wears the head-mounted display, a brain pattern of the user and to determine the user from a plurality of users using the detected brain pattern.

13. The head-mounted display according to claim 12, further comprising:
an eye tracking sensor configured to detect eye tracking data representing an eye viewing direction of a first eye and/or a second eye of the user wearing the head-mounted display; and
wherein, in the case that it is determined that the language skill of the user for the second language does not satisfy the determined language skill requirement, the one or more processors of the device are configured to:

determine a focus depth of the first eye and/or second eye of the user using the detected eye tracking data, and control the display device to display the subtitle in an image depth corresponding to the determined focus depth when presenting the other-language content of the video to the user.

14. The head-mounted display according to claim 12, further comprising:

an eye tracking sensor configured to detect eye tracking data representing an eye viewing direction of a first eye and/or a second eye of the user wearing the head-mounted display; and wherein, in the case that it is determined that the language skill of the user for the second language does not satisfy the determined language skill requirement, the one or more processors of the device are configured to:

control the display device to display the subtitle when presenting the other-language content of the immersive video to the user wearing the head-mounted display;

determine, using the detected eye tracking data, whether the user is looking at the subtitle when presenting the other-language content; and in the case that it is determined that the user is not looking at the subtitle, increase the language skill of the user for the second language.

15. The head-mounted display according to claim 12, wherein the one or more processors of the device are associated with a render performance threshold value representing a maximum rendering performance for rendering immersive images; and wherein the one or more processors of the device are configured to:

determine a render performance value representing a render performance required to render the plurality of images of the immersive video and the subtitle within one or more images of the plurality of images, determine, whether the determined render performance value is greater than the render performance threshold value, and in the case that it is determined that the determined render performance value is greater than the render performance threshold value, determine to not show the subtitle when presenting the other-language content of the immersive video to the user.

16. The head-mounted display according to claim 12, wherein the head-mounted display is an augmented reality device;

wherein the immersive video is an immersive video for augmented reality;

wherein the display device is configured to display augmented reality including the immersive video within a surrounding of the user and to display the subtitle; and wherein the one or more processors of the device are configured to: in the case that it is determined that the language skill of the user for the second language does not satisfy the determined language skill requirement, determine a position at which the subtitle is to be displayed when presenting the other-language content to the user such that a contrast between the augmented reality and the subtitle is increased.

* * * * *